(12) United States Patent
Katsuki et al.

(10) Patent No.: US 11,202,044 B2
(45) Date of Patent: Dec. 14, 2021

(54) IMAGE PROCESSING APPARATUS AND METHOD

(71) Applicant: SONY CORPORATION, Tokyo (JP)

(72) Inventors: Yugo Katsuki, Tokyo (JP); Naoki Kobayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/606,820

(22) PCT Filed: May 11, 2018

(86) PCT No.: PCT/JP2018/018252
§ 371 (c)(1),
(2) Date: Oct. 21, 2019

(87) PCT Pub. No.: WO2018/216500
PCT Pub. Date: Nov. 29, 2018

(65) Prior Publication Data
US 2020/0389631 A1 Dec. 10, 2020

(30) Foreign Application Priority Data
May 26, 2017 (JP) .............................. JP2017-104222

(51) Int. Cl.
*G06T 5/50* (2006.01)
*H04N 9/31* (2006.01)
(Continued)

(52) U.S. Cl.
CPC .......... *H04N 9/3194* (2013.01); *G06T 5/008* (2013.01); *G06T 5/50* (2013.01); *G06T 11/00* (2013.01); *H04N 9/3179* (2013.01)

(58) Field of Classification Search
CPC ............................... G06T 5/008; G06T 11/00
(Continued)

(56) References Cited

U.S. PATENT DOCUMENTS 7,038,727 B2 * 5/2006 Majumder ............... H04N 9/12
348/189
2004/0252381 A1 12/2004 Takagi
(Continued)

FOREIGN PATENT DOCUMENTS

CN 102760291 A 10/2012
CN 102792245 A 11/2012
(Continued)

OTHER PUBLICATIONS

Partial European Search Report of EP Application No. 18805679.0, dated Apr. 7, 2020, 14 pages.
(Continued)

*Primary Examiner* — Thomas J Lett
(74) *Attorney, Agent, or Firm* — Chip Law Group

(57) ABSTRACT

The present disclosure relates to image processing apparatus and method configured so that degradation of invisibility of a pattern can be reduced. According to the luminance of a contents image, a luminance difference between two pattern images projected in a superimposed state on the contents image, having an identical shape, and having patterns in opposite luminance change directions is adjusted. The present disclosure is, for example, applicable to an image processing apparatus, an image projection apparatus, a control apparatus, an information processing apparatus, a projection image capturing system, an image processing method, a program, or the like.

12 Claims, 34 Drawing Sheets

(51) Int. Cl.
*G06T 5/00* (2006.01)
*G06T 11/00* (2006.01)

(58) Field of Classification Search
USPC .......................................................... 345/633
See application file for complete search history.

(56) References Cited

U.S. PATENT DOCUMENTS

| | | | |
|---|---|---|---|
| 2011/0227827 | A1 | 9/2011 | Solomon et al. |
| 2012/0244940 | A1 | 9/2012 | Solomon et al. |
| 2014/0205136 | A1* | 7/2014 | Oshima ................... H04N 3/00 382/100 |
| 2015/0208050 | A1 | 7/2015 | Pawlak et al. |
| 2016/0127704 | A1 | 5/2016 | Ouchi |
| 2018/0054602 | A1 | 2/2018 | Ouchi |
| 2018/0167555 | A1* | 6/2018 | Li ........................ H04N 13/111 |
| 2019/0313070 | A1* | 10/2019 | Boujut-Burgun ......... G06T 7/70 |

FOREIGN PATENT DOCUMENTS

| | | |
|---|---|---|
| CN | 103888700 A | 6/2014 |
| CN | 104463858 A | 3/2015 |
| CN | 106464825 A | 2/2017 |
| EP | 2548102 A2 | 1/2013 |
| JP | 2011-050013 A | 3/2011 |
| JP | 2011-222172 A | 11/2011 |
| JP | 2013-522766 A | 6/2013 |
| JP | 2013-192098 A | 9/2013 |
| JP | 2015-159524 A | 9/2015 |
| JP | 2015-166893 A | 9/2015 |
| JP | 2016-090673 A | 5/2016 |
| JP | 6609098 B2 | 11/2019 |
| KR | 10-2013-0016277 A | 2/2013 |
| WO | 2011/115764 A2 | 9/2011 |
| WO | 2016/147888 A1 | 9/2016 |

OTHER PUBLICATIONS

International Search Report and Written Opinion of PCT Application No. PCT/JP2018/018252, dated Aug. 7, 2018, 11 pages of ISRWO.

Office Action for CN Patent Application No. 201880033204.1, dated Aug. 3, 2021, 12 pages of Office Action and 16 pages of English Translation.

* cited by examiner

FIG. 13

$$\Delta rev = f1(\Delta, \text{input}) \quad \text{if } (A \leq \text{input} \leq 255) \quad \leftarrow f1 : \text{HIGH-LUMINANCE AMPLITUDE ADJUSTMENT FUNCTION}$$
$$= f2(\Delta, \text{input}) \quad \text{else if } (0 \leq \text{input} \leq B) \quad \leftarrow f2 : \text{LOW-LUMINANCE AMPLITUDE ADJUSTMENT FUNCTION}$$
$$= \Delta \quad \text{else}$$

A, B : CONSTANT
$\Delta$ rev : AMPLITUDE AFTER CORRECTION

FIG. 17

```
pos_val = input + Δrev ;
neg_val = input - Δrev ;
if (pos_val > 255 || neg_val < 0) {
    if(((255-input) < input)) {
        Δrev = (255 -input);
    }else{
        Δrev = input;
    }
}
```

IMAGE PROCESSING APPARATUS AND METHOD

CROSS REFERENCE TO RELATED APPLICATIONS

This application is a U.S. National Phase of International Patent Application No. PCT/JP2018/018252 filed on May 11, 2018, which claims priority benefit of Japanese Patent Application No. JP 2017-104222 filed in the Japan Patent Office on May 26, 2017. Each of the above-referenced applications is hereby incorporated herein by reference in its entirety.

TECHNICAL FIELD

The present disclosure relates to image processing apparatus and method, and specifically relates to image processing apparatus and method configured so that degradation of invisibility can be reduced.

BACKGROUND ART

Conveniently, for reducing distortion of a projection image projected by a projector and performing position adjustment of each projection image from multiple projectors, there is a method in which the projection image is captured by a camera and geometric correction for the projection image according to the position and posture of the projector, a projection surface shape, and the like is performed using the captured image. In the case of such a method, a corresponding point needs to be obtained between the projection image and the captured image.

For example, an imperceptible structured light (ISL) method in which a pattern image is embedded in a projected contents image has been considered as online sensing as the technology of obtaining the corresponding point during projection of the contents image (see, for example, Patent Document 1). In the ISL method, two pattern images having the same pattern and having opposite luminance change directions are embedded and projected on continuous frames of the contents image, and in this manner, invisibility of the pattern is provided.

CITATION LIST

Patent Document

Patent Document 1: Japanese Patent Application Laid-Open No. 2013-192098

SUMMARY OF THE INVENTION

Problems to be Solved by the Invention

However, due to device characteristics of the projector, the luminance of the projection image might change from the luminance of the image to be projected. For this reason, there has been a probability that in the projection image, the magnitude of a luminance difference (an amplitude) between two ISL-method pattern images embedded in the contents image changes depending on the luminance of the contents image, and there has been a probability that invisibility is degraded depending on the luminance of the contents image.

The present disclosure has been made in view of such a situation, and is for reducing degradation of invisibility of a pattern.

Solutions to Problems

An image processing apparatus of one aspect of the present technology is an image processing apparatus including an adjustment section configured to adjust, according to a luminance of a contents image, a luminance difference between two pattern images projected in a superimposed state on the contents image, having an identical shape, and having patterns in opposite luminance change directions.

An image processing method of one aspect of the present technology is an image processing method including adjusting, according to the luminance of a contents image, a luminance difference between two pattern images projected in a superimposed state on the contents image, having an identical shape, and having patterns in opposite luminance change directions.

An image processing apparatus of another aspect of the present technology is an image processing apparatus including a corresponding point detection section configured to capture a projection image of a pattern image, detect a pattern of the pattern image from an obtained captured image, and repeat capturing of the projection image and detection of the pattern from the captured image until a reliability of all patterns included in detection results reaches high when a corresponding point is detected from the detected pattern.

An image processing method according to another aspect of the present technology is an image processing method including capturing a projection image of a pattern image, detecting a pattern of the pattern image from an obtained captured image, and repeating capturing of the projection image and detection of the pattern from the captured image until a reliability of all patterns included in detection results reaches high when a corresponding point is detected from the detected pattern.

In the image processing apparatus and method of one aspect of the present technology, the luminance difference between two pattern images projected in the superimposed state on the contents image, having the identical shape, and having the patterns in the opposite luminance change directions is adjusted according to the luminance of the contents image.

In an information processing apparatus and method of another aspect of the present technology, the projection image of the pattern image is captured, the pattern of the pattern image is detected from the obtained captured image, and capturing of the projection image and detection of the pattern from the captured image are repeated until the reliability of all patterns included in the detection results reaches high when the corresponding point is detected from the detected pattern.

Effects of the Invention

According to the present disclosure, the image can be processed. Specifically, degradation of the invisibility of the pattern can be reduced.

BRIEF DESCRIPTION OF DRAWINGS

FIG. 13 is a view of an example of a program for luminance amplitude adjustment.

FIG. 17 is a view of an example of a program for clipping.

MODE FOR CARRYING OUT THE INVENTION

Hereinafter, modes (hereinafter referred to as "embodiments") for carrying out the present disclosure will be described. Note that description will be made in the following order:

1. ISL Method and Invisibility of Pattern;
2. First Embodiment (Projection Image Capturing System);
3. Second Embodiment (Projection Image Capturing System/Projection Image Capturing Apparatus); and
4. Other.

1. ISL Method and Invisibility of Pattern

<Corresponding Point Detection and Geometric Correction>

Figure 1B:
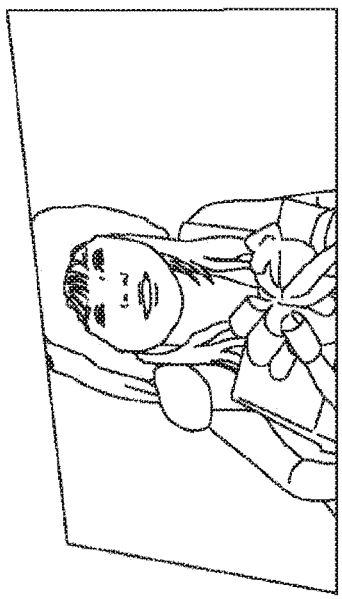
FIGS. 1A and 1B are views of an example of a geometric correction state.
Figure 1A:
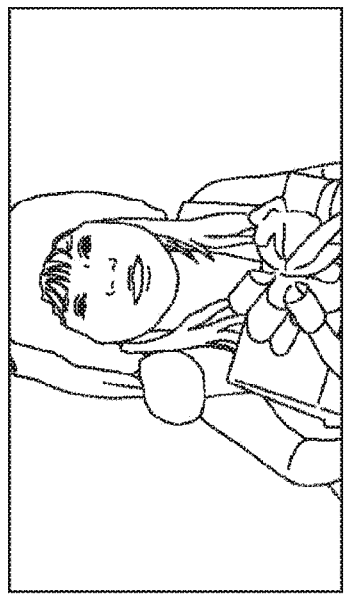

Depending on a posture (a position, an orientation, or the like) with respect to a projection surface (a screen, a wall, or the like) of a projector, the shape of the projection surface, or the like, a projected image (also referred to as a "projection image") is, in some cases, distorted as in, for example, FIG. 1A, leading to a difficulty in viewing such an image. In such a case, geometric correction such as distortion correction is performed for the image projected by the projector so that distortion of the projection image can be reduced as in an example of FIG. 1B and the image can be easily viewed.

Figure 2B:
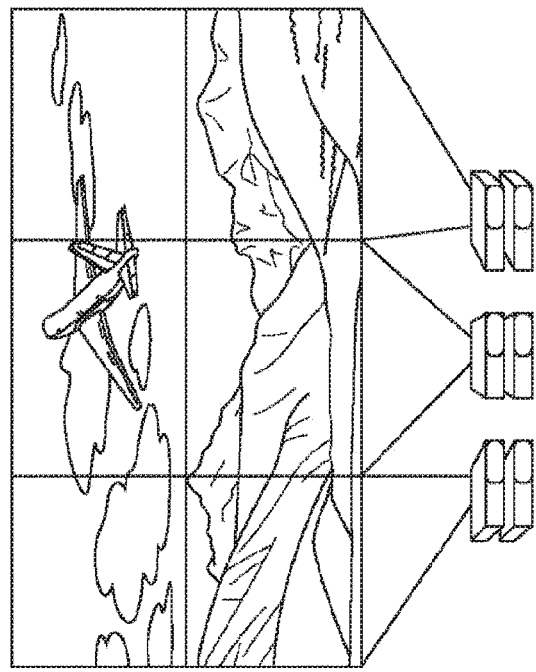
FIGS. 2A and 2B are views of an example of the geometric correction state.
Figure 2A:
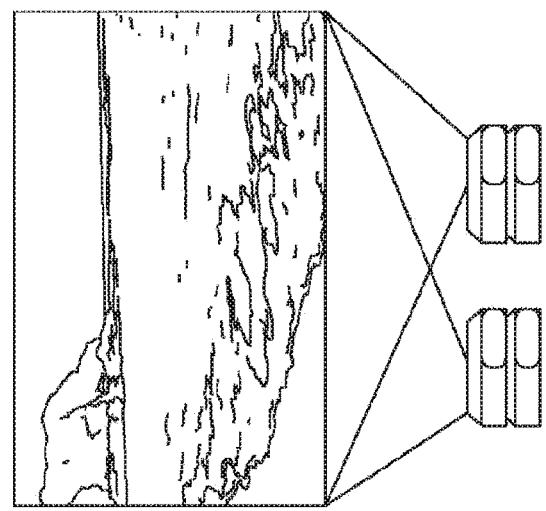

Moreover, as in an example of FIGS. 2A and 2B, there is a system configured to project images by multiple projectors to form a single projection image. For example, as in FIG. 2A, there is a method in which images are projected to the same position from multiple projectors to increase a contrast ratio and realize a high dynamic range. Further, as in, for example, FIG. 2B, there is a method in which projection images each projected from projectors are arranged to form a larger projection image (a higher-resolution projection image than a projection image projected by a single projector) than the projection image projected by the single projector. In the case of these methods, if a position relationship among the projection images each projected from the projectors is improper, the quality of the entirety of the projection image might be degraded due to image superimposition or unnecessary clearance generation caused by shift of the projection images. For this reason, not only the above-described distortion correction for each projection image but also geometric correction such as position adjustment among the projection images might be necessary.

Figure 3:
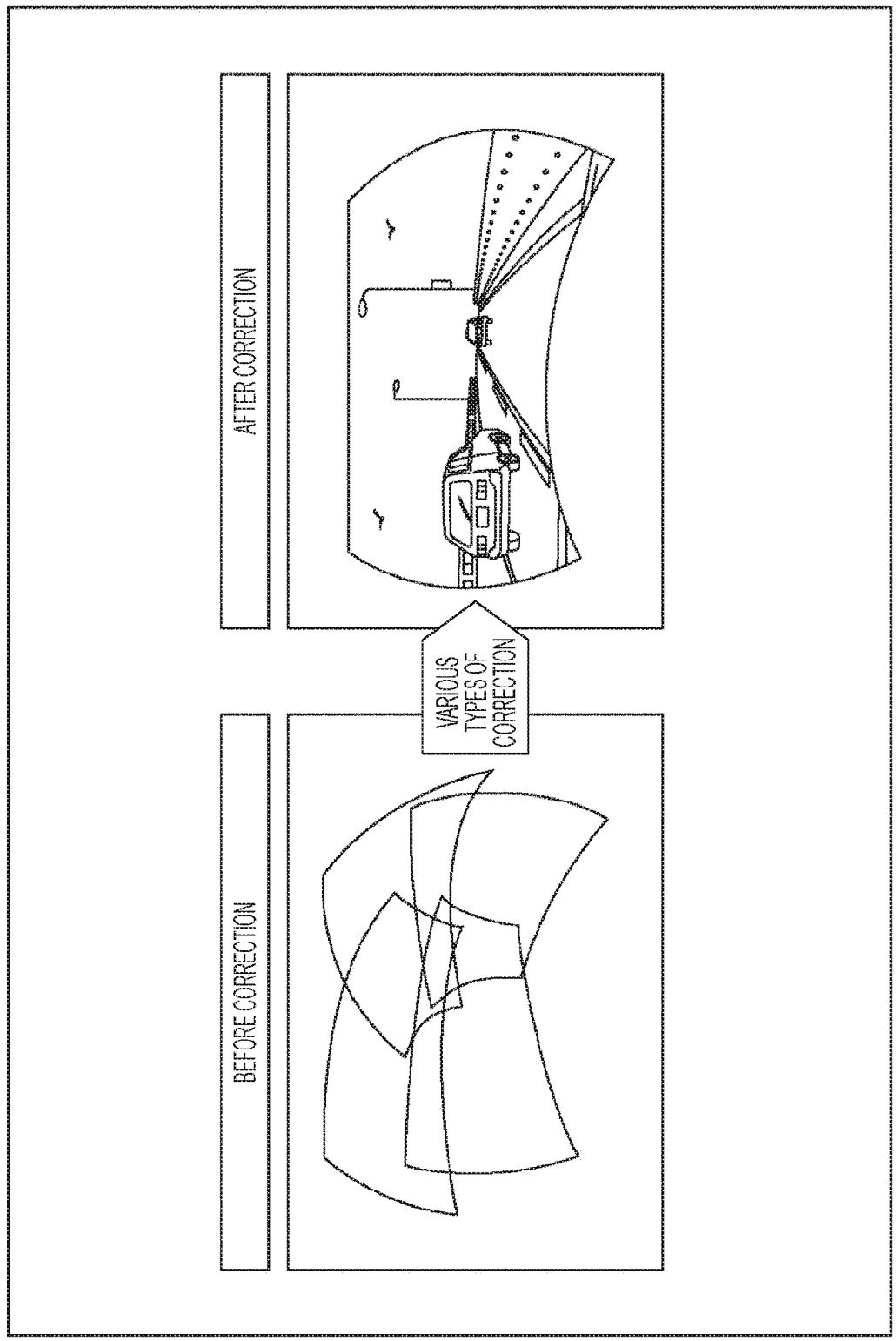
FIG. 3 is a view of an example of the geometric correction state.

By geometric correction for the projected images as described above, even in a case where images are projected on a curved projection surface from multiple projectors as in an example of FIG. 3, projection can be performed as if a single image is formed. Note that in a case where the multiple projection images are arranged to form the larger projection image as in FIG. 2B and the example of FIG. 3, the adjacent projection images are partially superimposed on each other (overlap with each other) as in the example of FIG. 3, position adjustment can be more facilitated.

Such geometric correction can be manually performed by an operator operating the projector and the like, but there is a probability that a complicated process is necessary. For this reason, a method in which a camera is used to capture a projection image projected by a projector to perform geometric correction by means of such a projection image has been considered.

Figure 4:
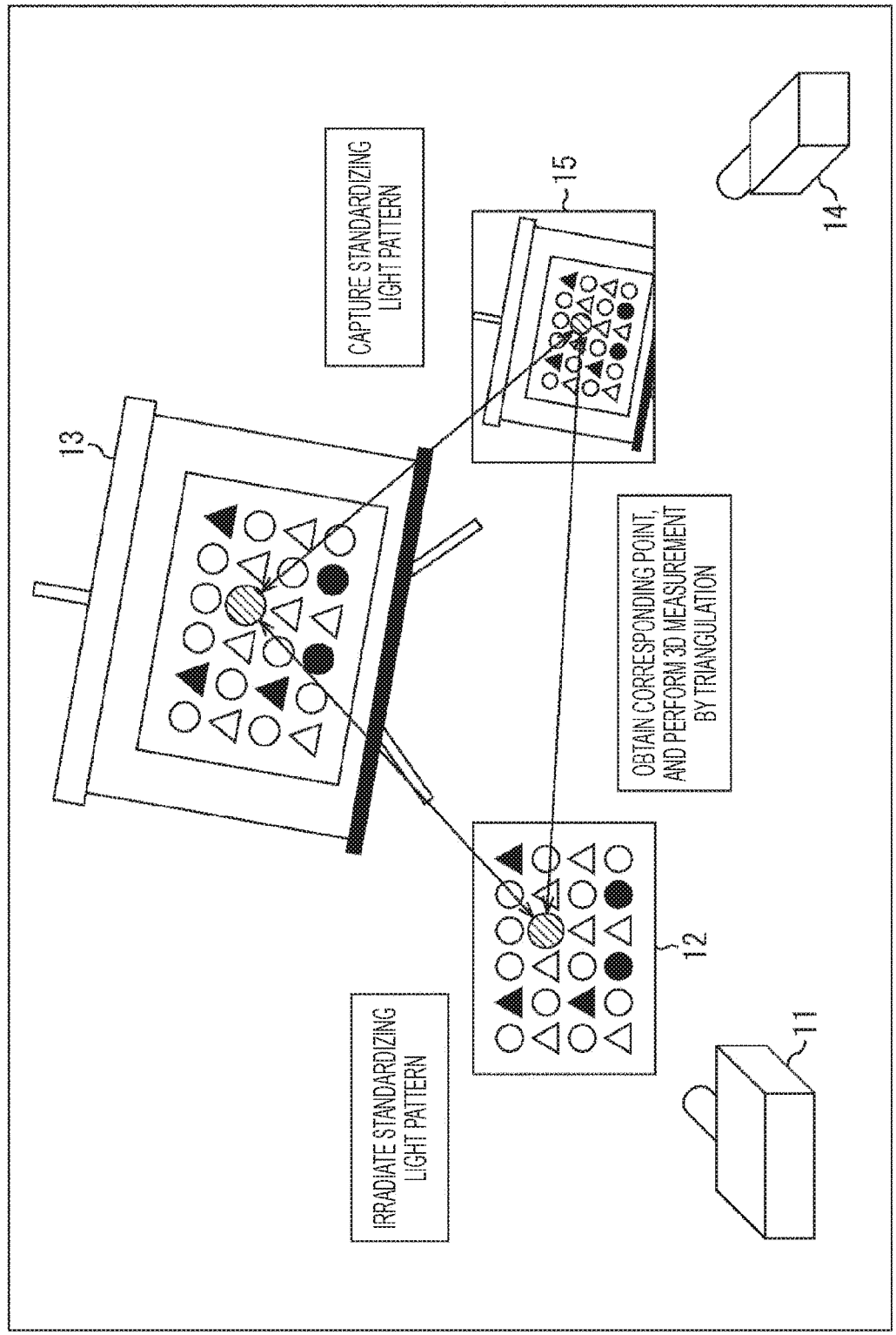
FIG. 4 is a view of an example of a corresponding point detection state.

For example, as in an example of FIG. 4, a standardizing light pattern 12 with a predetermined design is projected on a screen 13 from a projector 11, and a camera 14 captures the projected standardizing light pattern 12 to obtain a captured image 15. Then, a corresponding point between the standardizing light pattern 12 and the captured image 15 is obtained on the basis of the design of the standardizing light pattern 12, and on the basis of the corresponding point, the postures (the position relationship) of the projector 11 and the camera 14, the shape of the screen 13, and the like are obtained by triangulation and the like. Geometric correction is performed on the basis of such a result. In this manner, geometric correction can be more easily performed as compared to the case of manually performing geometric correction.

In the case of performing geometric correction by means of the camera as described above, the corresponding point (pixels of the projection image and the captured image corresponding to the same position on the projection surface) between the projection image (may be an image to be projected) and the captured image needs to be obtained. That is, a correspondence between the pixel of the camera 14 (the captured image 15) and the pixel of the projector 11 (the standardizing light pattern 12) needs to be obtained.

Moreover, in the case of using the multiple projectors as in the examples of FIGS. 2A, 2B and 3, the position relationship among the projection images also needs to be obtained.

Figure 5:
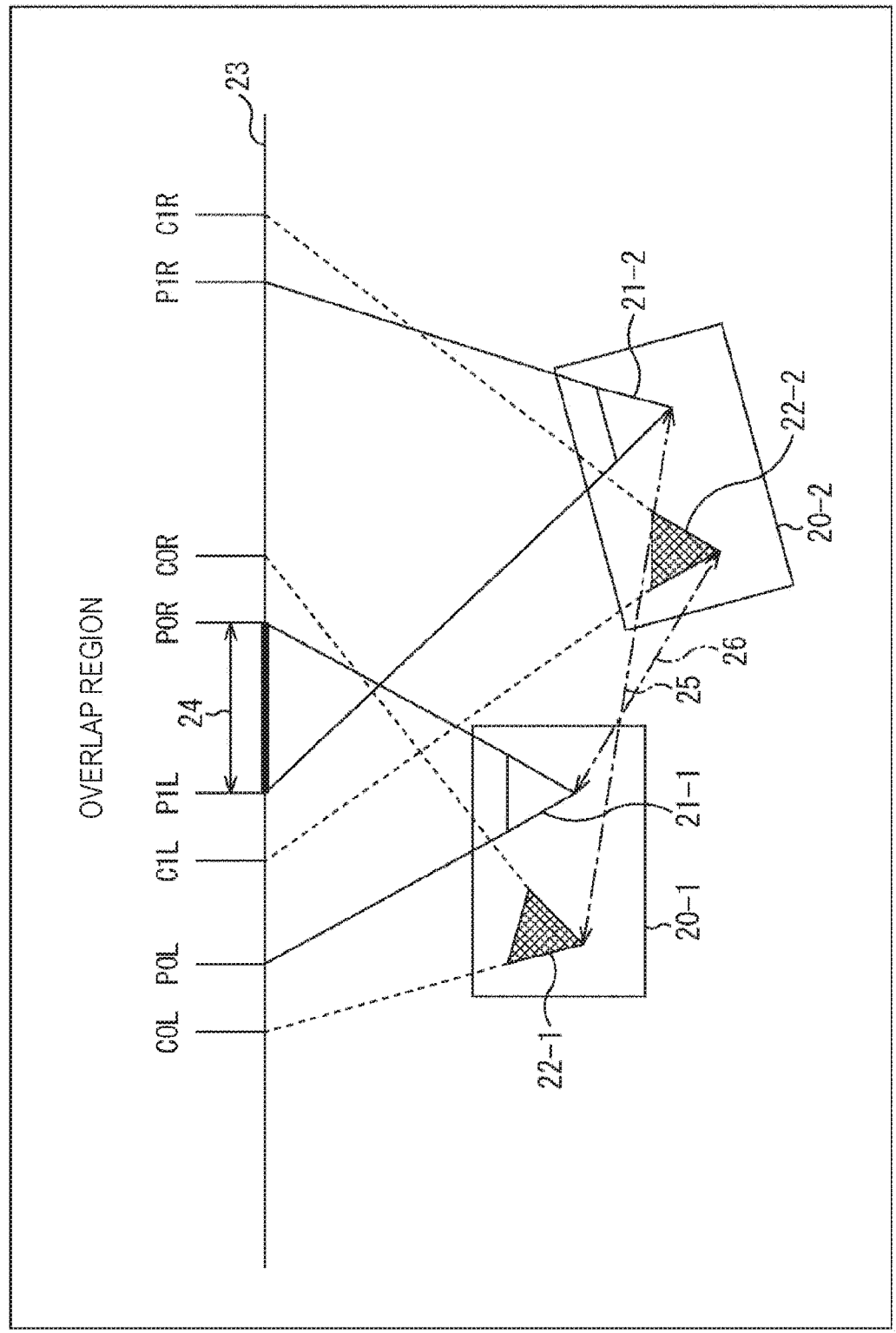
FIG. 5 is a view of an example of the corresponding point detection state.

For example, suppose that a projection image capturing apparatus 20-1 having a projection section 21-1 (a projector) and an image capturing section 22-1 (a camera) and a projection image capturing apparatus 20-2 having a projection section 21-2 (a projector) and an image capturing section 22-2 (a camera) cooperate to project images as in an example of FIG. 5. In a case where it is not necessary to distinctively describe the projection image capturing apparatus 20-1 and the projection image capturing apparatus 20-2, these apparatuses will be referred to as a "projection image capturing apparatus 20". Moreover, in a case where it is not necessary to distinctively describe the projection section 21-1 and the projection section 21-2, these sections will be referred to as a "projection section 21". Further, in a case where it is not necessary to distinctively describe the image capturing section 22-1 and the image capturing section 22-2, these sections will be referred to as an "image capturing section 22".

As illustrated in FIG. 5, a projection region (a projection image area) of a projection surface 23 by the projection section 21-1 of the projection image capturing apparatus 20-1 is an area of P0L to P0R. Moreover, a projection region of the projection surface 23 by the projection section 21-2 of the projection image capturing apparatus 20-2 is an area of P1L to P1R. That is, an area (an area of P1L to P0R) indicated by a double-headed arrow 24 is an overlap region where projection images are superimposed on each other.

Note that an image capturing region (an area included in a captured image) of the projection surface 23 by the image capturing section 22-1 of the projection image capturing apparatus 20-1 is an area of C0L to C0R. Moreover, an image capturing region (an area included in a captured image) of the projection surface 23 by the image capturing section 22-2 of the projection image capturing apparatus 20-2 is an area of C1L to C1R.

Figure 6:
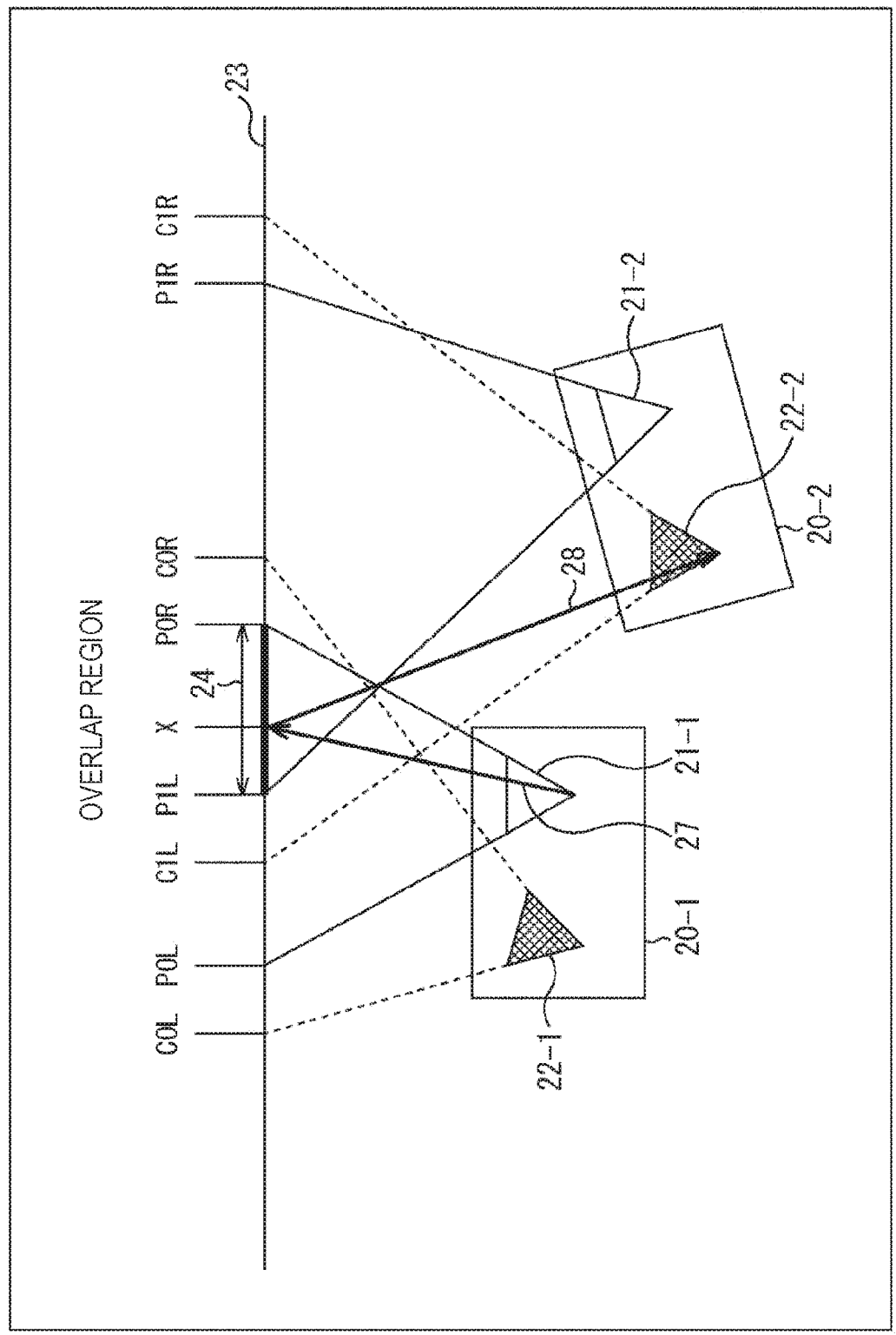
FIG. 6 is a view of an example of the corresponding point detection state.

In the case of such a system, not only a corresponding point between the projection section 21 and the image capturing section 22 at each projection image capturing apparatus 20 needs to be obtained, but also a corresponding point between the projection section 21 and the image capturing section 22 needs to be obtained among the projection image capturing apparatuses 20 for performing position adjustment between projection images, as described above. Thus, as in, for example, FIG. 6, a pixel of the image capturing section 22-2 receiving (an arrow 28) light (an arrow 27) emitted from a certain pixel of the projection section 21-1 and reflected on X of the projection surface 23 is obtained. Moreover, a similar pixel correspondence between the projection section 21-2 and the image capturing section 22-1 is also obtained.

As described above, the corresponding point between the projection section 21 and the image capturing section 22 is obtained for all projection sections 21 and all image capturing sections 22 for which the corresponding points can be obtained, and therefore, position adjustment of the overlap region (the area indicated by the double-headed arrow 24) can be performed by geometric correction.

<Online Sensing>

It is assumed that such corresponding point detection for geometric correction is performed before video projection begins, but there is a probability that these corresponding points are shifted during video projection after initial installation due to influence of disturbance such as a temperature or vibration and the like. If the corresponding points are shifted, there is a probability that geometric correction becomes improper and distortion or position shift of projection images occurs.

In such a case, corresponding point detection needs to be performed again, but it is not preferable for a user viewing such video to interrupt video projection for such corresponding point detection (there is a probability that the degree of satisfaction is lowered). For this reason, a method (online sensing) in which a corresponding point is detected while video projection is being continued has been considered.

For example, a method using invisible light such as infrared, a method using an image feature amount such as SIFT, an imperceptible structured light (ISL) method, or the like is conceivable as an online sensing technology. In the case of the method using the invisible light such as infrared, a projector (for example, an infrared projector) configured to project the invisible light is further necessary, and for this reason, there is a probability that a cost is increased. Moreover, in the case of the method using the image feature amount such as SIFT, the detection accuracy and density of a corresponding point depend on image contents to be projected, and for this reason, it is difficult to perform corresponding point detection with stable accuracy.

On the other hand, in the case of the ISL method, visible light is used, and therefore, an increase in the number of system components (i.e., a cost increase) can be suppressed. Moreover, corresponding point detection can be performed with stable accuracy without dependence on an image to be projected.

<ISL Method>

The ISL method is the technology of performing positive-negative reversal for a structuring light pattern as an image with a predetermined pattern to embed the structuring light pattern in a projection image, thereby performing projection such that the structuring light pattern is not perceived by a human.

Figure 7:
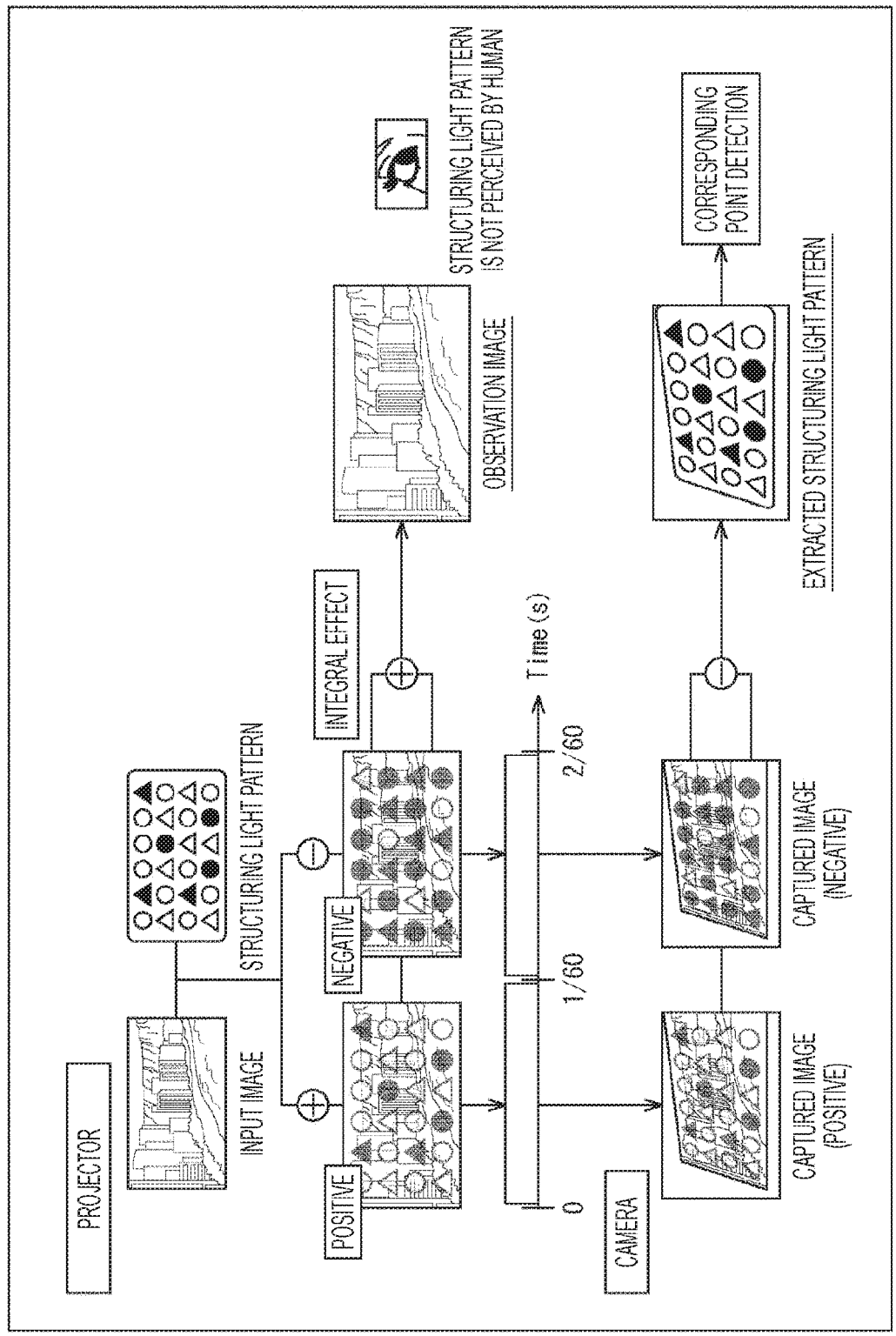
FIG. 7 is a view for describing an example of ISL.

As illustrated in FIG. 7, a projector adds a predetermined structuring light pattern to a certain frame of an input image, thereby generating such a frame image that a positive image of the structuring light pattern is synthesized with the input image (a contents image). The projector draws the structuring light pattern from a subsequent frame of the input image, thereby generating such a frame image that a negative image of the structuring light pattern is synthesized with the input image. Then, the projector continuously projects these frames. Two positive and negative frames switched at high speed are perceived in a combined state by human eyes due to an integral effect. As a result, it is difficult for a user viewing a projection image to recognize the structuring light pattern embedded in the input image.

Meanwhile, a camera captures the projection images of these frames to obtain a difference between captured images of both frames. In this manner, the camera extracts only the structuring light pattern included in the captured image. Using such an extracted structuring light pattern, corresponding point detection is performed.

As described above, the difference between the captured images is merely obtained in the ISL method so that the structuring light pattern can be easily extracted. Ideally, corresponding point detection can be performed with stable accuracy without dependence on an image to be projected.

<Structure of Structuring Light Pattern>

Figure 8:
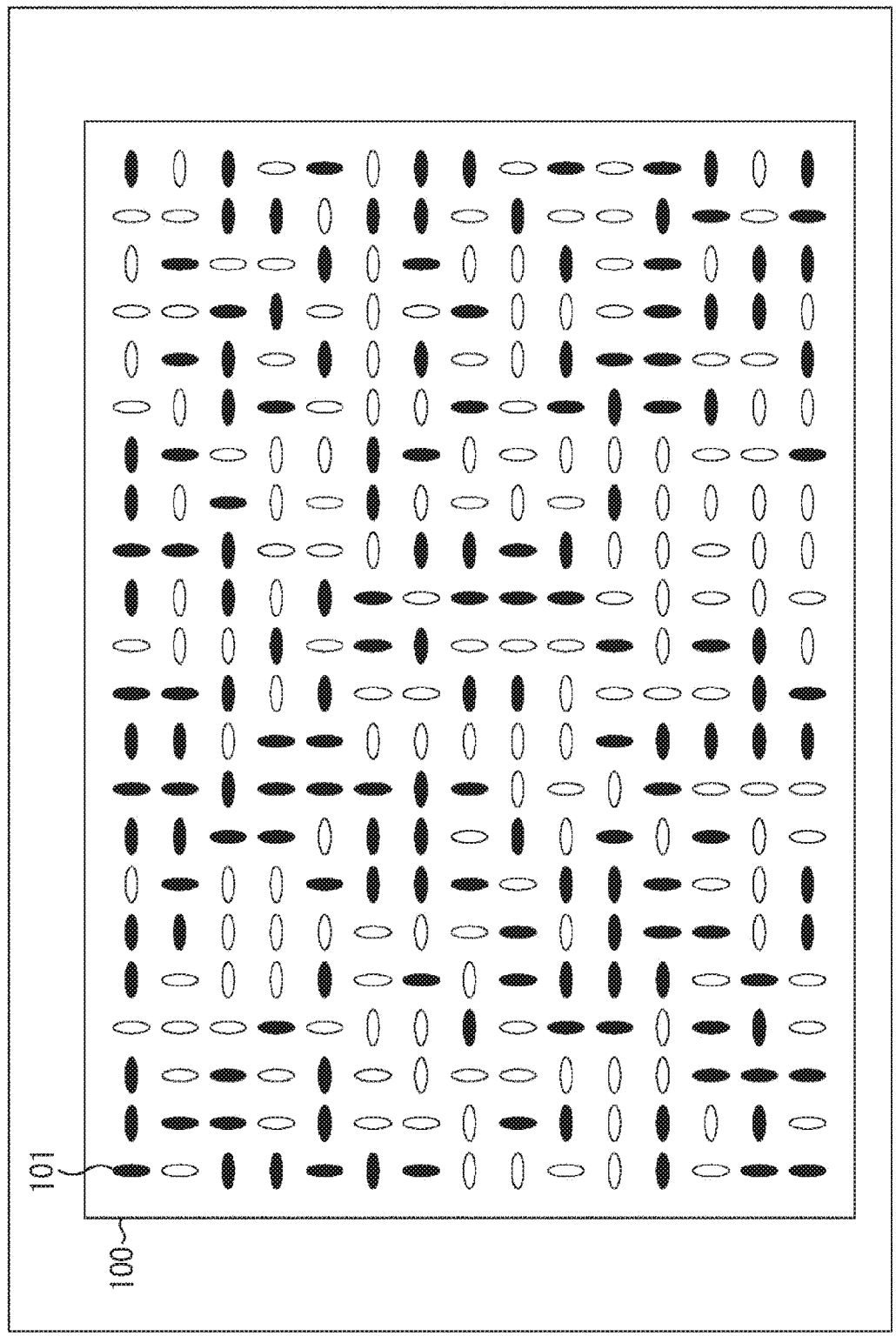
FIG. 8 is a view of an example of a structuring light pattern.

A specific example of the structuring light pattern will be illustrated in FIG. 8. A pattern image 100 illustrated in FIG. 8 is the structuring light pattern of the ISL method projected in a superimposed state on the contents image. The pattern image 100 is for detecting a corresponding point (i.e., the pixel correspondence between the projection section and the image capturing section) between a projection image projected by the projection section and a captured image captured by the image capturing section, and as illustrated in FIG. 8, has multiple oval luminance distribution patterns 101 having different luminance values from peripheral luminance values. That is, in the pattern image 100, the multiple patterns 101 different in luminance from peripheral patterns are arranged (formed).

In FIG. 8, a white oval pattern 101 indicates a pattern example where a luminance change direction is a positive direction, and a black oval pattern 101 indicates a pattern example where the luminance change direction is a negative direction. The size of each pattern 101 is optional, and the patterns 101 may have the same size or may have non-identical sizes. Moreover, each of the patterns 101 may have the same luminance distribution, or may have non-identical luminance distributions.

Figure 9:
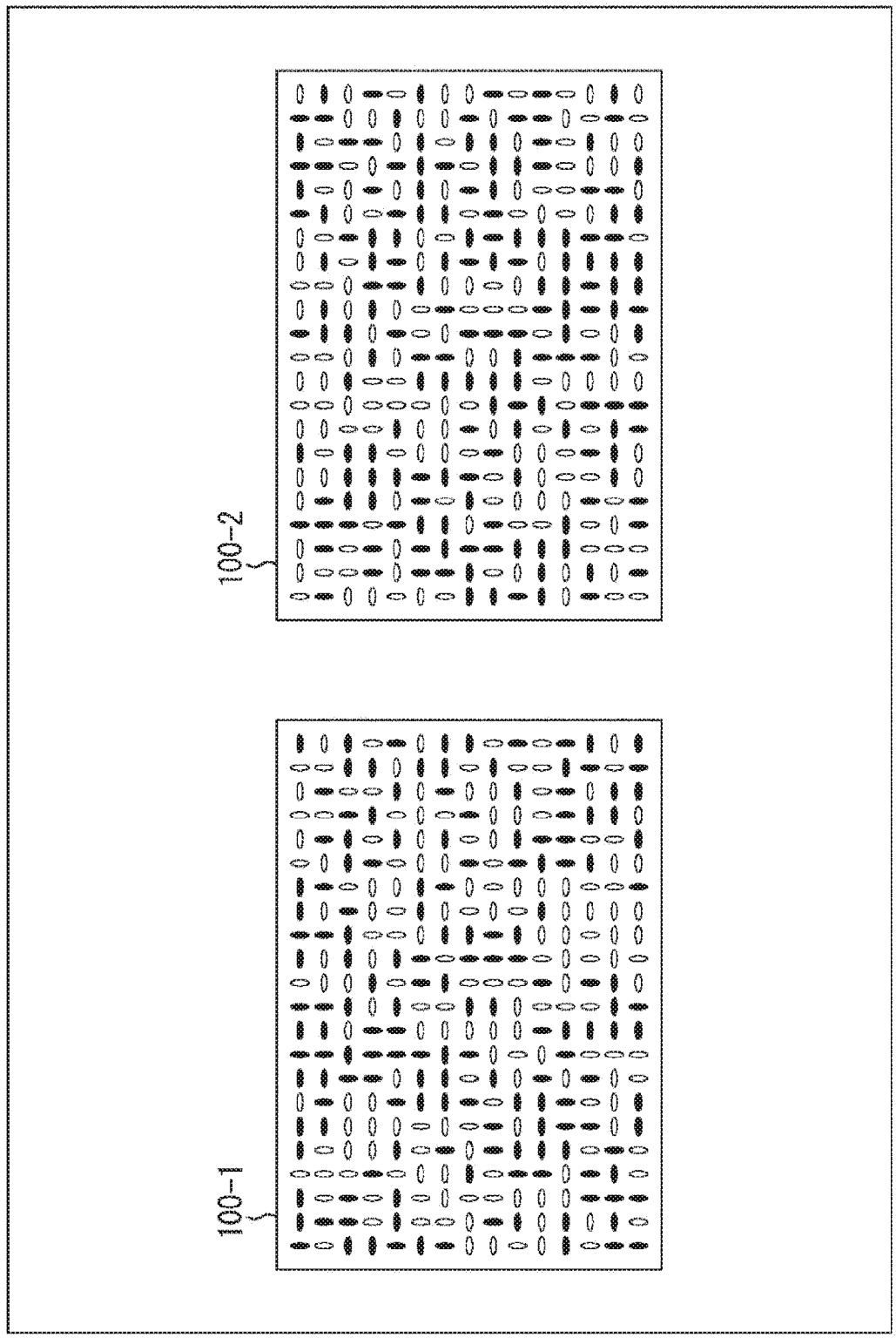
FIG. 9 is a view of examples of positive and negative images of the structuring light pattern.

In the case of the ISL method, the pattern image 100 configured as described above is projected with the pattern image 100 being superimposed on other images (for example, the contents image). In this state, in a similar manner to the case described with reference to FIG. 7, projection is performed with the luminance value of the pattern image 100 being added to a certain frame of the contents image and the luminance value of the pattern image 100 being subtracted from a subsequent frame. That is, as illustrated in FIG. 9, the pattern image 100 is superimposed as a positive image 100-1 or a negative image 100-2 on the contents image. The negative image 100-2 is an image obtained in such a manner that the positive and negative of the luminance value of the positive image 100-1 are inverted. That is, the positive image 100-1 and the negative image 100-2 have the same pattern shape, and have opposite luminance change directions.

Projection is performed with the positive image 100-1 and the negative image 100-2 described above being superimposed on two continuous frames, and therefore, it is difficult for the user viewing the projection image to perceive the pattern image 100 due to the integral effect (can contribute to invisibility of the pattern image 100).

<Influence Due to Luminance Change>

In the case of the ISL method, the difference between the captured images is obtained as described above, and in this manner, pattern detection is performed. That is, the pattern is obtained as a difference between the luminance of the positive image 100-1 and the luminance of the negative image 100-2. This difference will be also referred to as an "amplitude".

Figure 10:
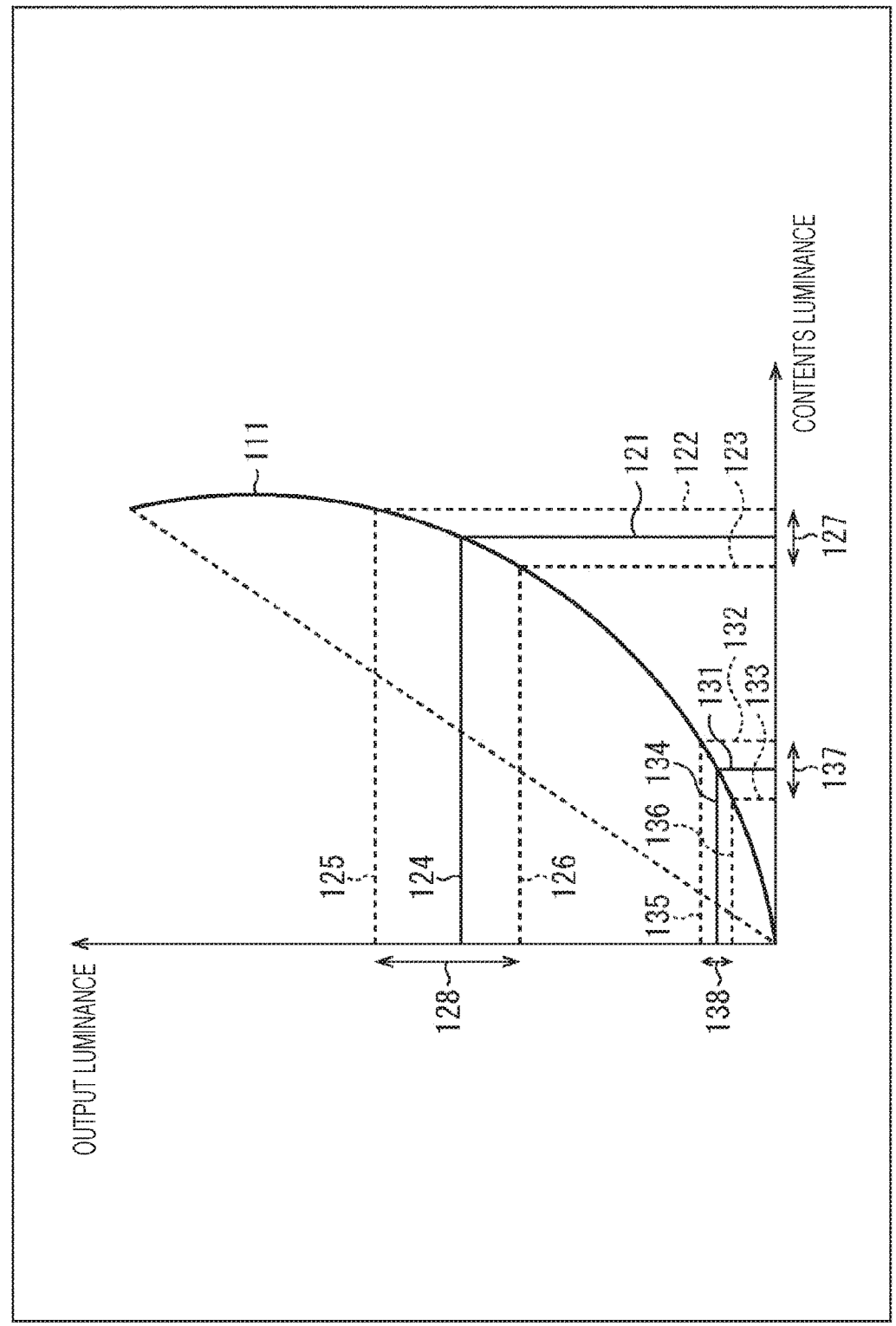
FIG. 10 is a graph of an example of gamma characteristics of a projector.

However, there is a probability that the magnitude of the amplitude in the projection image is different from that in the pattern image 100 due to an external factor such as device characteristics of the projector. For example, suppose that the projector has gamma characteristics as in a gamma curve 111 illustrated in FIG. 10. For example, in a case where a luminance value (a contents luminance) in the contents image to be projected is a value indicated by a solid line 121, a luminance value (an output luminance) in the projection image is a value indicated by a solid line 124.

Thus, assuming that a contents luminance in a case where a pattern showing a luminance change in the positive direction is embedded (superimposed) in such a contents image is a value indicated by a dashed line 122, an output luminance is a value indicated by a dashed line 125. Similarly, assuming that a contents luminance in a case where a pattern showing a luminance change in the negative direction is embedded (superimposed) in such a contents image is a value indicated by a dashed line 123, an output luminance is a value indicated by a dashed line 126.

That is, in this case, the amplitude of the pattern 101 with a magnitude indicated by a double-headed arrow 127 in terms of the contents luminance is expanded to a magnitude indicated by a double-headed arrow 128. Thus, the pattern 101 superimposed on the contents image becomes noticeable, leading to the probability that the invisibility is degraded.

Moreover, in a case where the luminance value (the contents luminance) in the contents image to be projected is, for example, a value indicated by a solid line 131, the luminance value (the output luminance) in the projection image is a value indicated by a solid line 134. Further, assuming that the contents luminance in a case where the pattern showing the luminance change in the positive direction is embedded in such a contents image is a value indicated by a dashed line 132, the output luminance is a value indicated by a dashed line 135. Similarly, assuming that the contents luminance in a case where the pattern showing the luminance change in the negative direction is embedded in such a contents image is a value indicated by a dashed line 133, the output luminance is a value indicated by a dashed line 136.

That is, the amplitude of the pattern 101 with a magnitude indicated by a double-headed arrow 137 in terms of the contents luminance is narrowed to a magnitude indicated by a double-headed arrow 138. Thus, there is a probability that the detection accuracy of the pattern 101 is degraded.

As described above, in the case of the ISL method, there is a probability that the amplitude of the pattern 101 in the projection image changes according to the luminance of the contents image due to the external factor such as the gamma characteristics of the projector, and for this reason, the invisibility and detection accuracy of the pattern might be degraded.

<Amplitude Adjustment>

For these reasons, for reducing a change in the amplitude of the pattern 101 depending on the luminance of the contents image in the projection image (the output luminance) (keeping the amplitude as constant as possible), the amplitude (the luminance difference between the positive image 100-1 and the negative image 100-2) of the pattern 101 in the pattern image 100 is adjusted according to the luminance of the contents image on which the pattern 101 is superimposed. In this manner, degradation of the invisibility and detection accuracy of the pattern 101 can be reduced.

For example, it may be configured such that a higher luminance of the contents image results in a smaller amplitude of the pattern 101 in terms of the contents luminance. With this configuration, degradation of the invisibility of the pattern 101 can be reduced.

Figure 11:
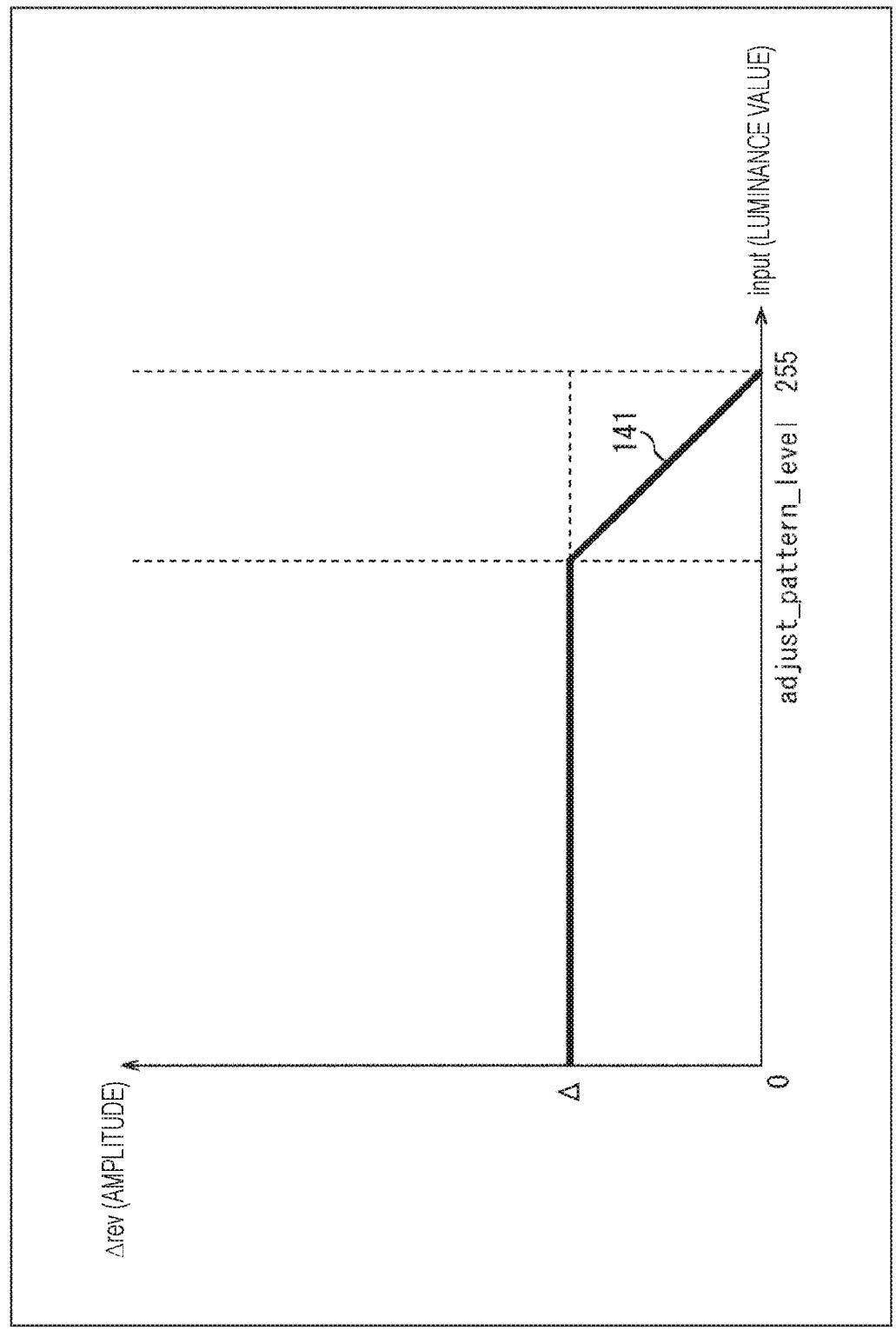
FIG. 11 is a graph of an example of high-luminance amplitude adjustment.

For example, as in a solid line 141 of a graph illustrated in FIG. 11, in a case where the luminance input of the contents image is equal to or higher than a predetermined threshold attenuate_pattern_level (an upper limit is 255), the amplitude Δ of the pattern 101 superimposed on such a portion may be decreased. In a case where the luminance input of the contents image is lower than the threshold attenuate_pattern_level, the amplitude Δ of the pattern 101 is unchanged.

For example, using an adjustment parameter attenuate_pattern_gain used for correction of the amplitude Δ of the pattern 101, the amplitude Δrev of the pattern 101 after adjustment can be obtained as in Expression (1) below.

$$\Delta rev=\Delta \times (attenuate\_pattern\_gain \times (attenuate\_pattern\_level-input)+1) \quad (1)$$

With this configuration, degradation of the invisibility of the pattern 101 superimposed on the contents image with a higher luminance value than the threshold attenuate_pattern_level can be reduced. For example, in the case of performing projection by the projector having the gamma characteristics illustrated in FIG. 10, this configuration allows adjustment of the amplitude of the pattern 101 only in a case where the pattern 101 is more noticeable. Generally, the invisibility increases as the amplitude decreases, but as trade-off, the detection accuracy is degraded accordingly. Thus, as described above, amplitude adjustment is limited only to a case where the invisibility is particularly low (the case of equal to or greater than the predetermined threshold), and therefore, unnecessary degradation of the detection accuracy of the pattern 101 can be reduced. Moreover, no amplitude adjustment is performed when the luminance value of the contents image is lower than the threshold, and therefore, the amplitude adjustment processing load can be also reduced.

Note that it has been described with reference to FIG. 11 that the adjustment amount of the amplitude Δ of the pattern 101 within such a range that the luminance input of the contents image is equal to or higher than the threshold attenuate_pattern_level linearly changes according to the luminance input of the contents image, but such a change may be an optional function. For example, the adjustment amount may change in a curved manner.

Moreover, the amplitude of the pattern 101 in terms of the contents luminance may increase as the luminance of the contents image decreases, for example. With this configuration, degradation of the detection accuracy of the pattern 101 can be reduced.

Figure 12:
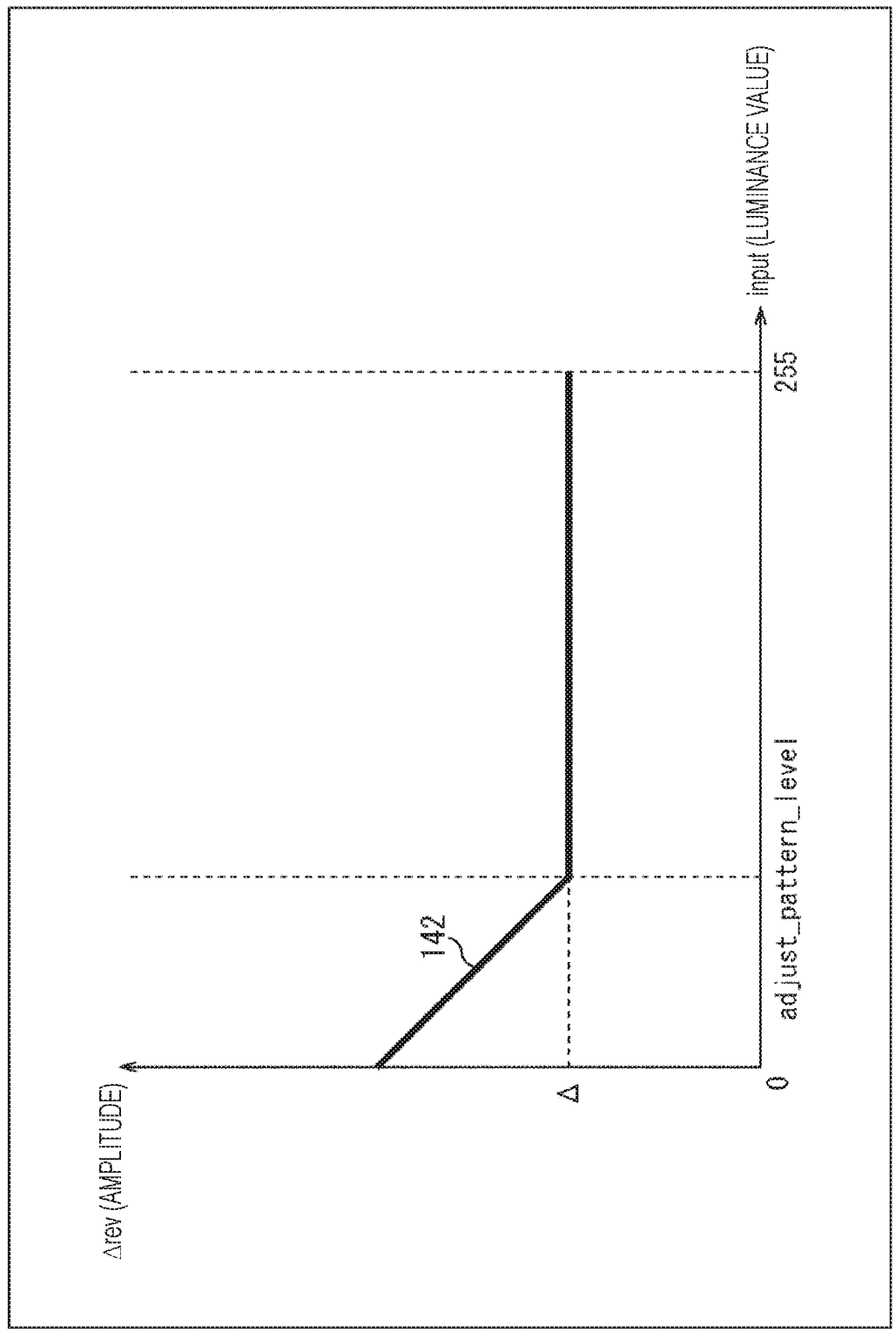
FIG. 12 is a graph of an example of low-luminance amplitude adjustment.

For example, as in a solid line 142 of a graph illustrated in FIG. 12, in a case where the luminance input of the contents image is equal to or lower than a predetermined threshold adjust_pattern_level (a lower limit is 0), the amplitude Δ of the pattern 101 superimposed on such a portion may be increased. In a case where the luminance input of the contents image is higher than the threshold adjust_pattern_level, the amplitude Δ of the pattern 101 is unchanged.

For example, using an adjustment parameter adjust pattern gain used for correction of the amplitude Δ of the pattern 101, the amplitude Δrev of the pattern 101 after adjustment can be obtained as in Expression (2) below.

$$\Delta rev=\Delta (adjust\_pattern\_gain \times (adjust\_pattern\_level-input)+1) \quad (2)$$

With this configuration, degradation of the detection accuracy of the pattern 101 superimposed on a portion of the contents image with a luminance value of equal to or lower than the threshold adjust_pattern_level can be reduced. For example, in the case of performing projection by the projector having the gamma characteristics illustrated in FIG. 10, this configuration allows adjustment of the amplitude of the pattern 101 only in a case where the detection accuracy of the pattern 101 is degraded. Generally, a higher amplitude results in a higher detection accuracy, but as trade-off, the invisibility is degraded accordingly. Thus, as described above, amplitude adjustment is limited only to a case where the detection accuracy is particularly low (the case of equal to or lower than the predetermined threshold), and therefore, unnecessary degradation of the invisibility of the pattern 101 can be reduced. Moreover, no amplitude adjustment is performed when the luminance value of the contents image is higher than the threshold, and therefore, the load on the processing for amplitude adjustment can be also reduced.

Note that it has been described with reference to FIG. 12 that the adjustment amount of the amplitude Δ of the pattern 101 within such a range that the luminance input of the contents image is equal to or lower than the threshold adjust_pattern_level linearly changes according to the luminance input of the contents image, but such a change may be an optional function. For example, the adjustment amount may change in a curved manner.

Note that both of amplitude adjustment (high-luminance amplitude adjustment) described with reference to FIG. 11 and amplitude adjustment (low-luminance amplitude adjustment) described with reference to FIG. 12 may be performed. A description example of a program for implementing such adjustment is illustrated in FIG. 13.

In the case of the example of FIG. 13, if the luminance input of the contents image is equal to or higher than both of two thresholds A and B (A>B) (A≤input≤255), adjustment may be performed such that the amplitude Δ of the pattern 101 is decreased (f1 (Δ, input)). If the luminance of the contents image is equal to or lower than both of two thresholds A and B (0≤input≤B), adjustment may be performed such that the amplitude Δ of the pattern 101 is increased (f2(Δ, input)). If the luminance of the contents image is between these two thresholds A and B (A<input<B), no adjustment of the amplitude Δ of the pattern 101 (Δ) may be performed.

Note that the thresholds are not necessarily provided, and even in the case of any value of the luminance of the contents image, the amplitude Δ of the pattern 101 may be adjusted according to the luminance of the contents image such that the amplitude Δref of the pattern 101 in terms of the output luminance becomes more constant. In this case, the adjustment amount of the amplitude Δ of the pattern 101 is also optional. For example, in a case where the projector has the device characteristics of the gamma curve 111 as in FIG. 10, the amplitude Δ of the pattern 101 in terms of the contents luminance may be adjusted according to such a gamma curve such that the amplitude Δref of the pattern 101 in terms of the output luminance becomes more constant.

Note that adjustment of the amplitude of the pattern image 100 as described above may be performed such that degradation of the invisibility of the pattern 101 is reduced or degradation of the detection accuracy of the pattern 101 is reduced. Thus, for example, depending on the device characteristics of the projector and the like, the amplitude of the pattern 101 in terms of the contents luminance may increase as the luminance of the contents image increases. With this configuration, degradation of the detection accuracy of the pattern 101 can be reduced.

For example, in an example of FIG. 11, in a case where the luminance input of the contents image is equal to or higher than the predetermined threshold attenuate_pattern_level, the amplitude Δ of the pattern 101 superimposed on such a portion may be increased. With this configuration, amplitude adjustment can be limited to a case where the detection accuracy is particularly low (the case of equal to or higher than the predetermined threshold), and unnecessary degradation of the invisibility of the pattern 101 can be reduced. The amplitude adjustment processing load can be also reduced.

Alternatively, depending on, for example, the device characteristics of the projector, the amplitude of the pattern 101 in terms of the contents luminance may decrease as the luminance of the contents image decreases. With this configuration, degradation of the invisibility of the pattern 101 can be reduced.

For example, in an example of FIG. 12, in a case where the luminance input of the contents image is equal to or lower than the predetermined threshold adjust_pattern_level, the amplitude Δ of the pattern 101 superimposed on such a portion may be decreased. With this configuration, amplitude adjustment can be limited to a case where the invisibility is particularly low (the case of equal to or higher than the predetermined threshold), and unnecessary degradation of the detection accuracy of the pattern 101 can be reduced. The amplitude adjustment processing load can be also reduced.

<Luminance Clipping>

Moreover, in a case where the luminance of the contents image is close to the upper or lower limit of the luminance, there is a probability that the luminance value of the projection image exceeds the limit value due to superimposition of the pattern image 100. In a case where the luminance value of the projection image reaches the limit value, the amplitude loses balance, and symmetry with reference to the luminance of the contents image is not realized. Thus, there is a probability that the invisibility is degraded. Moreover, there is a probability that the detection accuracy is also degraded.

For these reasons, in this case, the amplitude of the pattern 101 is adjusted such that the luminance value does not exceed the limit value. With this configuration, degradation of the invisibility and detection accuracy of the pattern 101 can be reduced.

Figure 14:
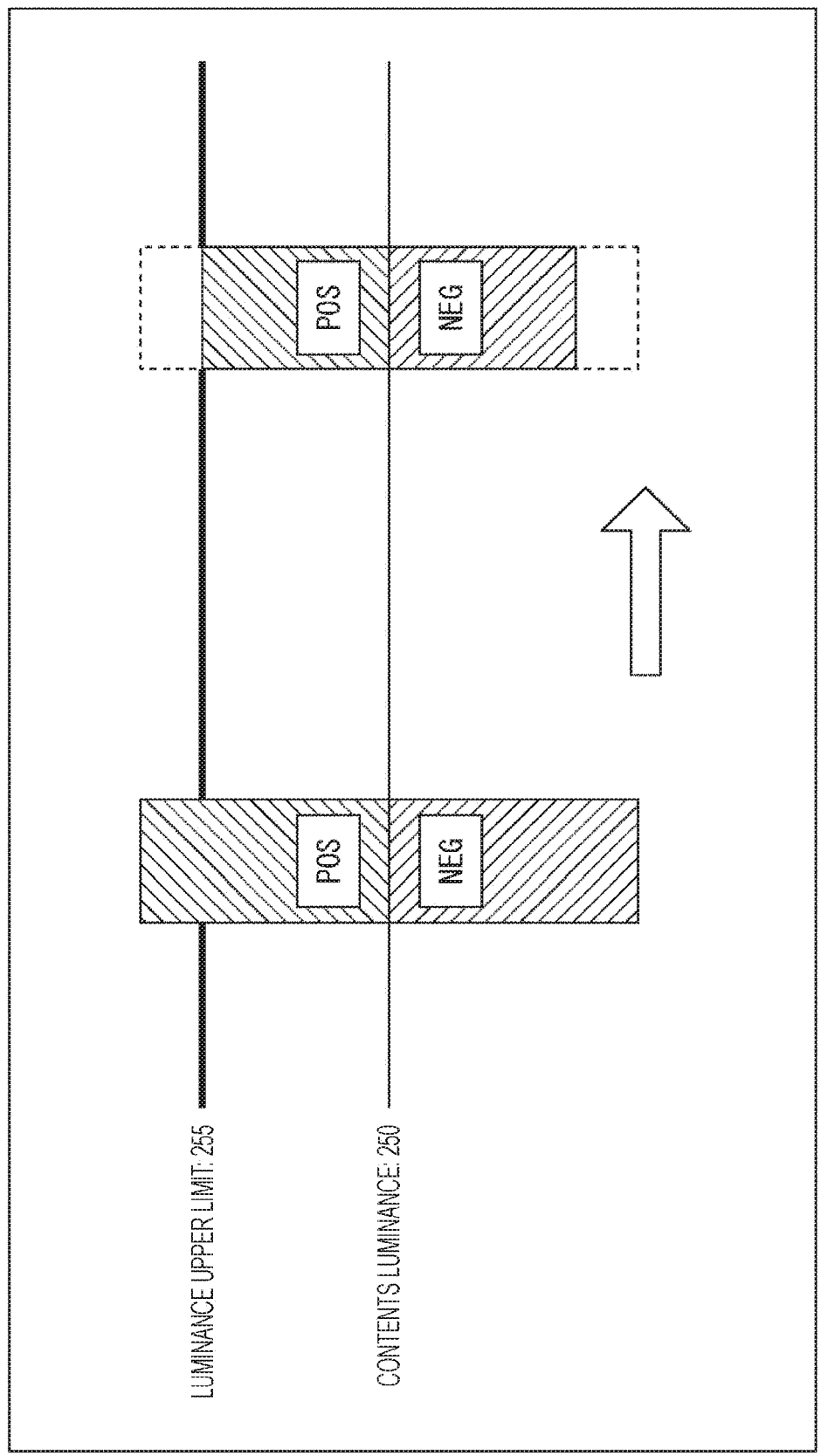
FIG. 14 is a chart of an example of upper limit clipping.

For example, in a case where the luminance upper limit is 255 and the luminance of the contents image is 250 as illustrated in FIG. 14, if the magnitude of the amplitude is equal to or greater than the 10, the luminance value exceeds the luminance upper limit as in a shaded portion illustrated at the left of FIG. 14. For reducing occurrence of such a state, the amplitude (i.e., the luminance difference between the positive image and the negative image) may be adjusted such that the luminance of the projection image does not exceed the upper limit. For example, as illustrated at the right of FIG. 14, the magnitude of the amplitude may be narrowed to 10.

Figure 15:
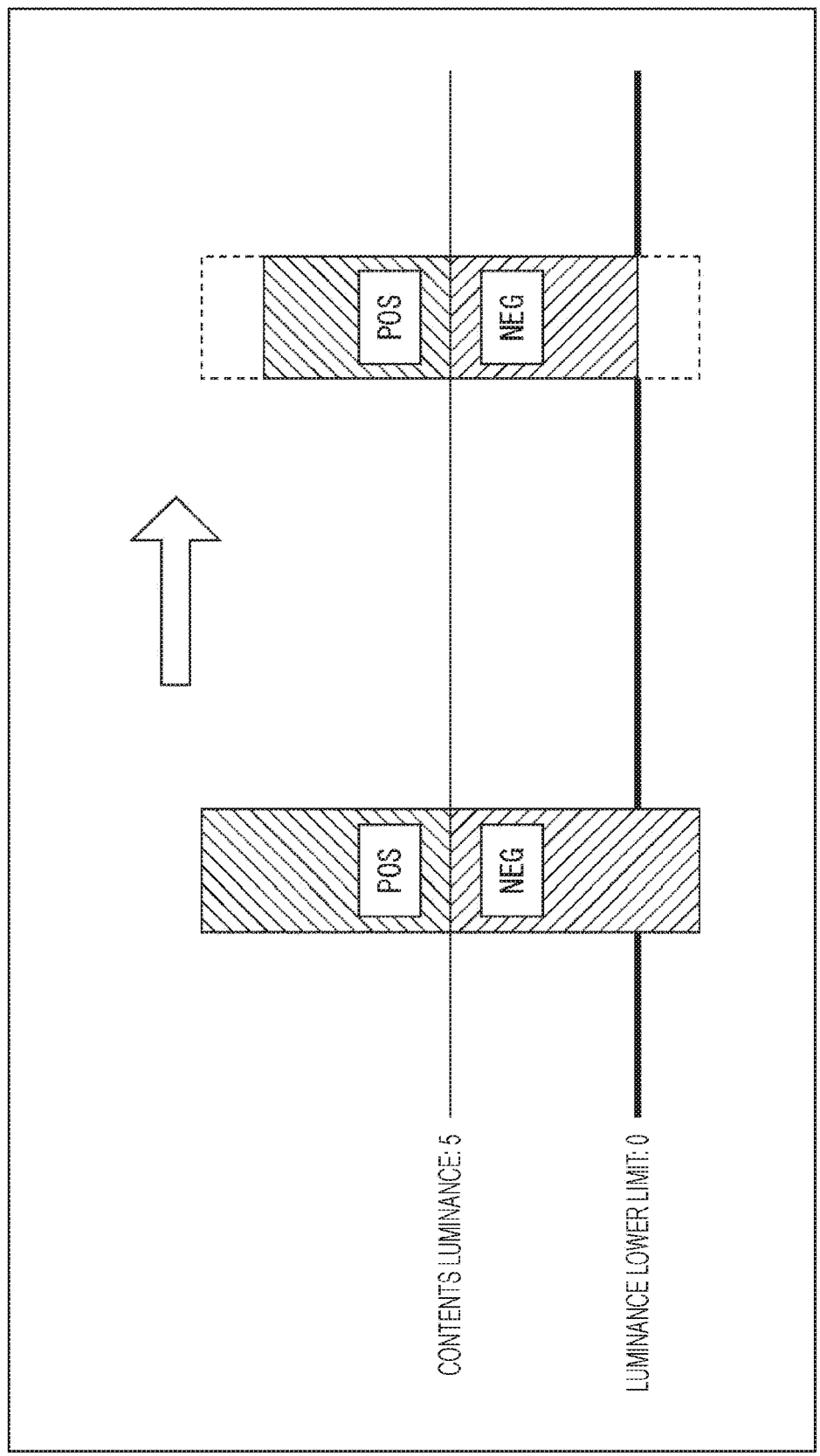
FIG. 15 is a chart of an example of lower limit clipping.

Moreover, for example, in a case where the luminance lower limit is 0 and the luminance of the contents image is 5 as illustrated in FIG. 15, if the magnitude of the amplitude is equal to or greater than 10, the luminance value falls below the luminance lower limit as in a shaded portion illustrated at the left of FIG. 15. For reducing occurrence of such a state, the amplitude (i.e., the luminance difference between the positive image and the negative image) may be adjusted such that the luminance of the projection image does not fall below the lower limit. For example, as illustrated at the right of FIG. 15, the magnitude of the amplitude may be narrowed to 10.

Figure 16:
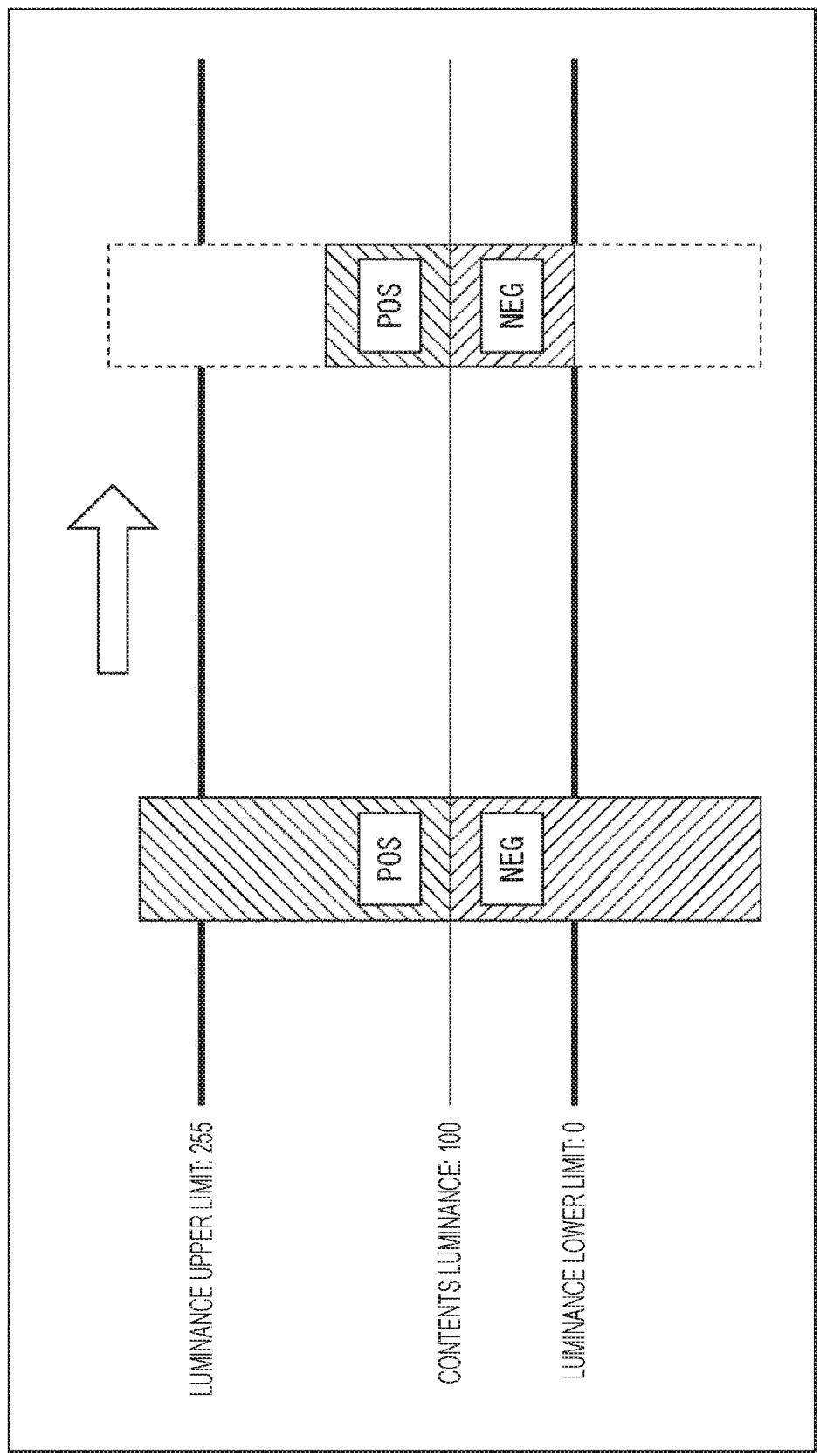
FIG. 16 is a chart of examples of upper/lower limit clipping.

Further, for example, in a case where the luminance lower limit is 0, the luminance upper limit is 255, and the luminance of the contents image is 100 as illustrated in FIG. 16, if the magnitude of the amplitude is equal to or greater than 256, the luminance value exceeds the luminance upper limit and falls below the luminance lower limit as in a shaded portion illustrated at the left of FIG. 16. For reducing occurrence of such a state, the amplitude may be adjusted such that the luminance does not exceed (or does not fall below) one of the luminance upper or lower limit closer to the luminance of the contents image.

More specifically, in a case where the luminance of the contents image is closer to the luminance upper limit than to the luminance lower limit, the amplitude may be adjusted such that the luminance of the projection image does not exceed the luminance upper limit. Similarly, in a case where the luminance of the contents image is closer to the luminance lower limit than to the luminance upper limit, the amplitude may be adjusted such that the luminance of the projection image does not fall below the luminance lower limit.

A description example of a program for implementing such adjustment is illustrated in FIG. 17. In the case of the example of FIG. 17, the luminance value (pos_val) of the positive image can be, using the luminance input of the contents image and the amplitude Δrev of the pattern 101 after adjustment, represented as in Expression (3) below. Similarly, the luminance value (neg_val) of the negative image can be, using the luminance input of the contents image and the amplitude Δrev of the pattern 101 after adjustment, represented as in Expression (4) below.

$$pos\_val = input + \Delta rev \quad (3)$$

$$neg\_val = input - \Delta rev \quad (4)$$

Moreover, in a case where the luminance value of the positive image exceeds the luminance upper limit (pos_val>255) or the luminance value of the negative image falls below the luminance lower limit (neg_val<0), when Expression (5) below is satisfied, the amplitude Δrev of the pattern 101 after adjustment is obtained by Expression (6) below. When not satisfied, the amplitude Δrev of the pattern 101 after adjustment is obtained by Expression (7) below.

$$(255 - input) < input \quad (5)$$

$$\Delta rev = (255 - input) \quad (6)$$

$$\Delta rev = input \quad (7)$$

The amplitude of the pattern 101 is adjusted as described above so that degradation of the invisibility and detection accuracy of the pattern 101 can be reduced.

<Processing Unit for Adjustment>

Various types of adjustment for the amplitude of the pattern 101 based on the luminance of the contents image as described above in <Amplitude Adjustment> and <Luminance Clipping> may be performed in optional units of the pattern image 100. For example, adjustment of the amplitude of the pattern 101 may be performed for every pixel. Alternatively, adjustment of the amplitude of the pattern 101 may be performed for every predetermined region, for example. For example, such adjustment may be performed for every pattern 101. Alternatively, adjustment of the amplitude of the pattern 101 may be performed in a single uniform way across the entirety of the pattern image 100, for example.

Note that in the case of performing adjustment of the amplitude of the pattern 101 for every pixel or every region, a parameter, an adjustment result, or the like, used for adjustment of other pixels or other regions may be used to perform adjustment of the amplitude for a processing target pixel or region.

Alternatively, adjustment of the amplitude of the pattern 101 as described above may be performed on the basis of the luminance in optional units of the contents image. For example, adjustment of the amplitude of the pattern 101 may be performed on the basis of the luminance of a predetermined pixel of the contents image. For example, adjustment of the amplitude of the pattern 101 may be performed on the basis of the luminance of a pixel (a pixel on which a processing target pixel of the pattern image 100 is to be superimposed) of the contents image corresponding to the processing target pixel, or may be performed on the basis of the luminance of other pixels.

Alternatively, adjustment of the amplitude of the pattern 101 may be performed on the basis of the luminance of multiple pixels of the contents image. In this case, such adjustment may be performed on the basis of a statistical value of the luminance of these multiple pixels. This statistical value is optional, and, for example, may be a maximum value, a minimum value, an average, or the like.

Alternatively, adjustment of the amplitude of the pattern 101 may be performed on the basis of the luminance of a predetermined region of the contents image. For example, adjustment of the luminance of the pattern 101 may be performed on the basis of the luminance of a region of the contents image in which the pattern 101 is embedded (superimposed). Alternatively, adjustment may be performed on the basis of the luminance of a region different from such a region.

Alternatively, adjustment of the amplitude of the pattern 101 may be performs on the basis of the luminance of all pixels of the contents image. In this case, such adjustment may be performed on the basis of a statistical value of the luminance of all pixels of the contents image. This statistical value is optional, and, for example, may be a maximum value, a minimum value, an average, or the like.

<Repetition of Pattern Detection>

In the ISL method, the projection image of the contents image on which the positive image is superimposed and the projection image of the contents image on which the negative image is superimposed are each captured as described above, and detection of the pattern 101 is performed from a difference image between these captured images.

Figure 18:
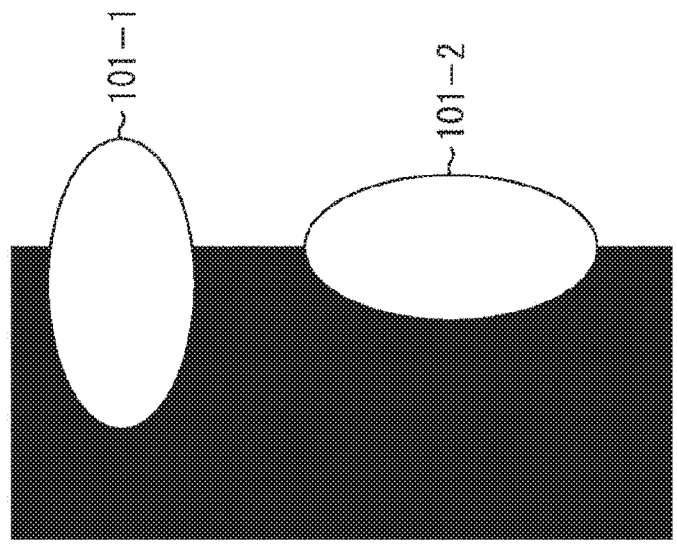
FIG. 18 is a view of an example of low-reliability pattern detection.

Note that in this case, the pattern 101 cannot be always detected with favorable accuracy. For example, as in a pattern 101-1 and a pattern 101-2 illustrated in FIG. 18, in a case where the pattern 101 is superimposed over an edge of the contents image, lack of the luminance as a variable or shape distortion occurs. Thus, there is a probability that the pattern 101 cannot be detected with favorable accuracy. In this case, there is a probability that an error is also caused in corresponding point detection.

For this reason, when the projection image of the pattern image is captured, the pattern of the pattern image is detected from the obtained captured image, and the corresponding point is detected from the detected pattern, capturing of the projection image and pattern detection from the captured image are repeated until the reliability of all patterns included in the detection results reaches high.

With this configuration, degradation of the detection accuracy of pattern detection can be reduced.

Figure 19:
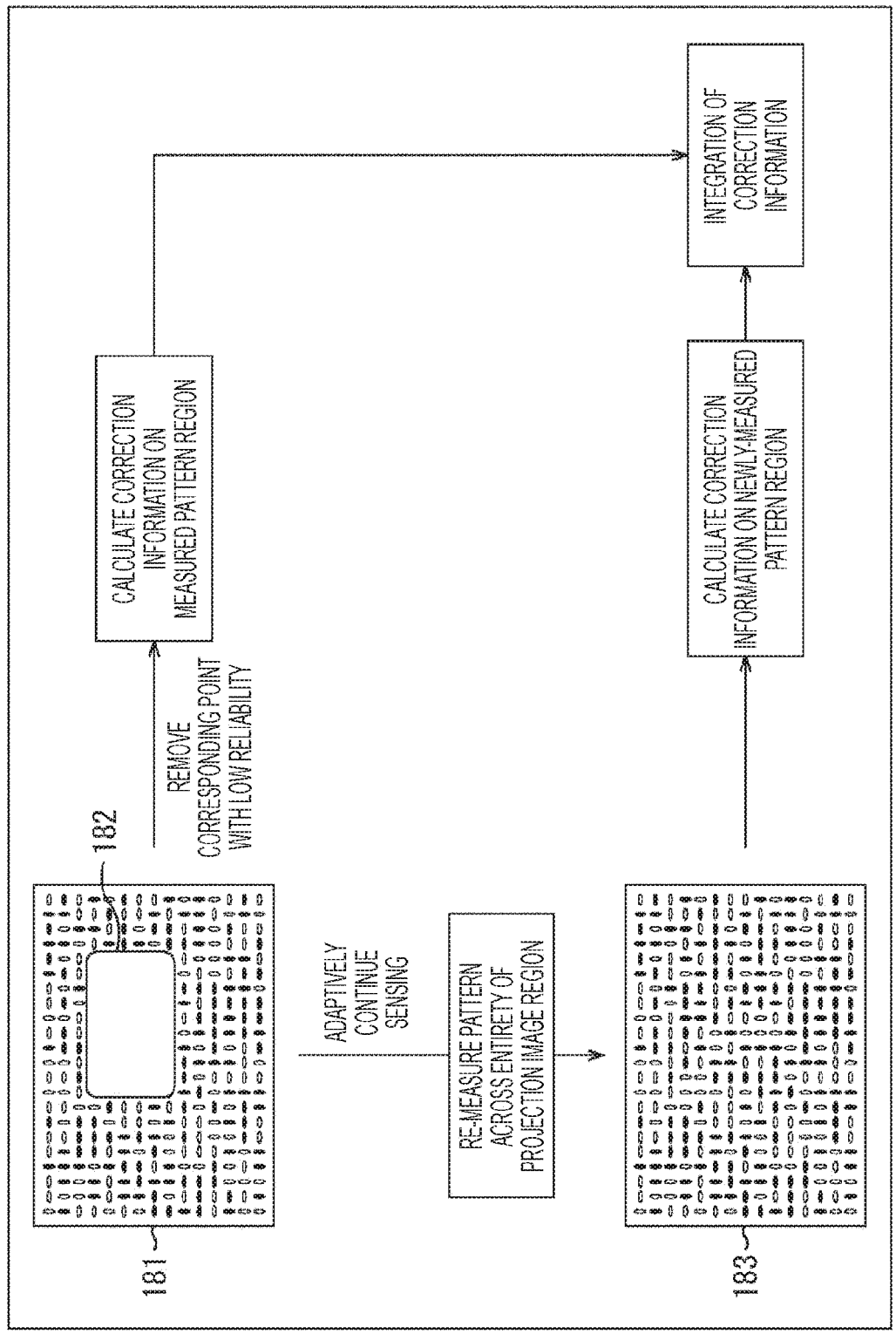
FIG. 19 is a view of an example of the corresponding point detection state accompanied by adaptive sensing.

For example, as illustrated in FIG. 19, in first pattern detection, the reliability of the pattern detection result is determined for a pattern image 181 detected by such first pattern detection processing. Then, in a case where a region 182 for which a sufficiently-high reliability cannot be obtained is present, capturing of the projection image and pattern detection are performed again.

Similarly in second pattern detection, the reliability of the pattern detection result is determined for a pattern image 183 detected by such second pattern detection processing. Then, in a case where it is determined that a sufficiently-high reliability is obtained for all patterns, corresponding point detection is performed on the basis of the pattern image, and correction processing such as posture estimation, projection screen reconfiguration, and geometric correction is performed to generate correction information.

With this configuration, degradation of the detection accuracy of the pattern can be reduced.

Note that a low-reliability pattern 101 included in the detection result in each detection of the pattern 101 may be removed, the detection result of each detection may be integrated, and the corresponding point may be detected on the basis of such an integrated detection result.

With this configuration, corresponding point detection can be performed on the basis of a higher-reliability detection result, and therefore, the accuracy of corresponding point detection can be improved. Moreover, the correction information for correcting the projection image may be calculated on the basis of such a detected corresponding point. With this configuration, higher-accuracy correction information can be obtained.

Alternatively, in each detection of the pattern 101, the low-reliability pattern 101 included in the detection result may be removed, the correction information may be calculated, and the correction information in each detection may be integrated. The method for integrating the correction information is optional. For example, the average of the correction information may be obtained as an integration result. Alternatively, the correction information may be integrated with the correction information being weighted according to the reliability. With this configuration, higher-accuracy correction information can be obtained.

2. First Embodiment

<Projection Image Capturing System>

Figure 20:
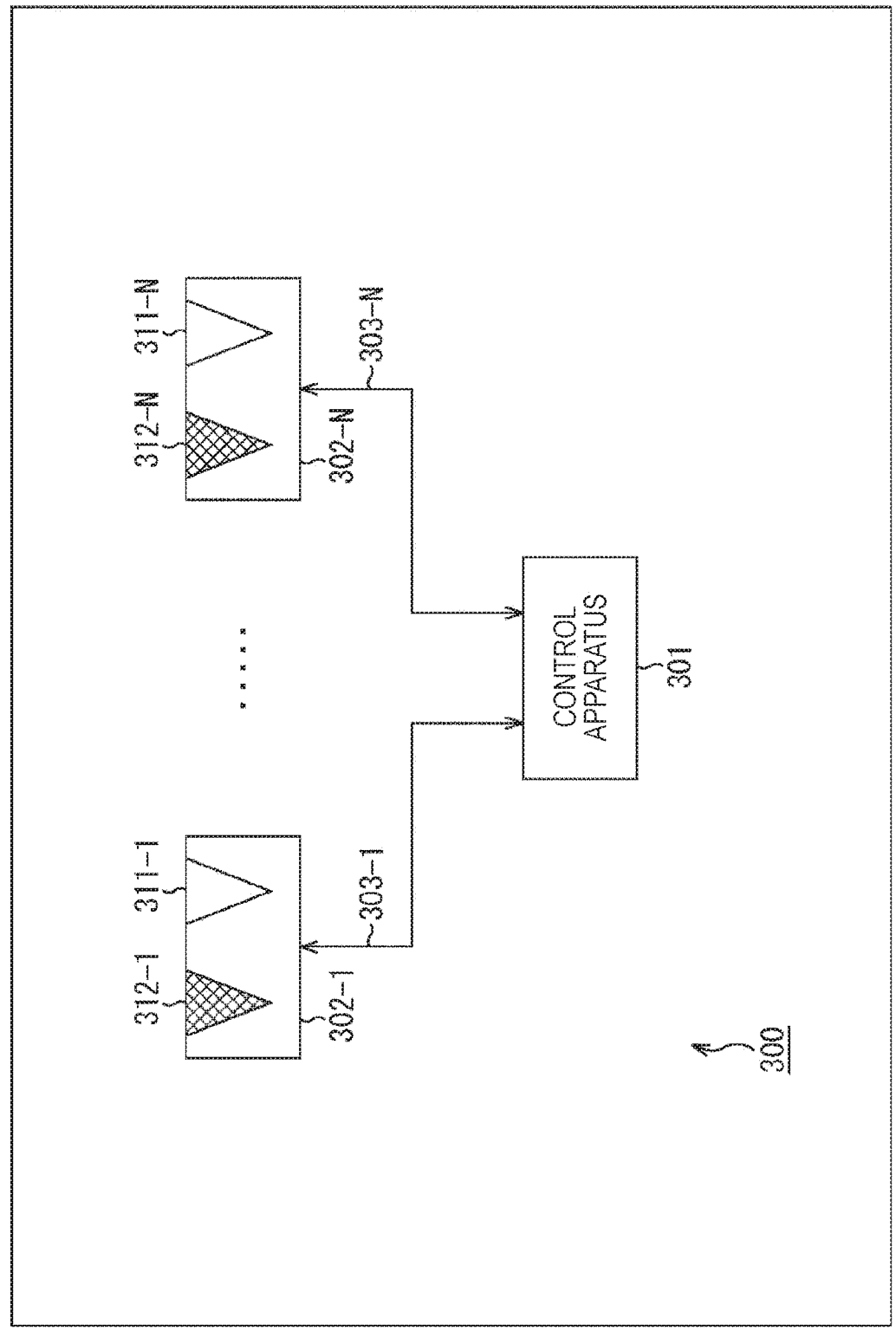
FIG. 20 is a block diagram of a main configuration example of a projection image capturing system.

Next, detection of a corresponding point by means of a pattern image 100 as described above will be described. FIG. 20 is a block diagram of a main configuration example of one embodiment of a projection image capturing system to which the present technology is applied. In FIG. 20, a projection image capturing system 300 is a system configured so that an image can be projected, a projection image can be captured, and corresponding point detection by the ISL method can be performed by the method to which the present technology is applied as described in <1. ISL Method and Invisibility of Pattern>.

As illustrated in FIG. 20, the projection image capturing system 300 has a control apparatus 301 and a projection image capturing apparatus 302-1 to a projection image capturing apparatus 302-N (N is an optional natural number). The projection image capturing apparatus 302-1 to the projection image capturing apparatus 302-N are each connected to the control apparatus 301 through a cable 303-1 to a cable 303-N.

Hereinafter, in a case where it is not necessary to distinctively describe the projection image capturing apparatus 302-1 to the projection image capturing apparatus 302-N, these apparatuses will be referred to as a "projection image capturing apparatus 302". Moreover, in a case where it is not necessary to distinctively describe the cable 303-1 to the cable 303-N, these cables will be referred to as a "cable 303".

The control apparatus 301 controls each projection image capturing apparatus 302 through the cable 303. For example, the control apparatus 301 can supply an image to be projected to each projection image capturing apparatus 302 so that such an image can be projected. Moreover, the control apparatus 301 can instruct, for example, each projection image capturing apparatus 302 to capture a projection image and the like to acquire a captured image of the projection image. Further, the control apparatus 301 can detect a corresponding point between the projection image and the captured image, and can perform geometric correction for the image to be projected by each projection image capturing apparatus 302 on the basis of the obtained corresponding point, for example. Note that such geometric correction may include not only image processing (for example, scaling, deformation, and the like) for the image to be projected, but also control (for example, control of a projection direction and an image capturing direction, and the like) of an optical system of each projection image capturing apparatus 302, and the like.

The projection image capturing apparatus 302-1 to the projection image capturing apparatus 302-N each have a projection section 311-1 to a projection section 311-N configured to project images and an image capturing section 312-1 to an image capturing section 312-N configured to capture images of an object. Hereinafter, in a case where it is not necessary to distinctively describe the projection section 311-1 to the projection section 311-N, these sections will be referred to as a "projection section 311". Moreover, in a case where it is not necessary to distinctively describe the image capturing section 312-1 to the image capturing section 312-N, these sections will be referred to as an "image capturing section 312".

The projection section 311 has a so-called projector function. That is, the projection image capturing apparatus 302 can be driven as a projector by means of the projection section 311. For example, the projection image capturing apparatus 302 can project, using the projection section 311, the image supplied from the control apparatus 301 on an optional projection surface.

The image capturing section 312 has a so-called camera function. That is, the projection image capturing apparatus 302 can be driven as a camera by means of the image capturing section 312. For example, the projection image capturing apparatus 302 can capture, using the image capturing section 312, an image of the projection surface on which the image is projected by the projection section 311, thereby supplying the obtained captured image data to the control apparatus 301.

The number of projection image capturing apparatuses 302 is optional, and may be a single number or a plural number. In the case of multiple projection image capturing apparatuses 302, the projection image capturing apparatuses 302 can cooperate with each other under control of the control apparatus 301 to perform image projection as described with reference to FIGS. 2A, 2B and 3. That is, the projection image capturing system 300 in this case is a so-called multi-projection system, and can implement so-called projection mapping.

Note that an image projection direction and an image magnification by the projection section 311, projection image distortion correction, and the like may be controllable. For such control, for example, the positions and postures of an optical system included in the projection section 311 and the entirety of the projection section 311 may be controllable.

Moreover, an image capturing direction and the angle of view by the image capturing section 312, captured image distortion correction, and the like may be controllable. For such control, for example, the positions and postures of an optical system included in the image capturing section 312 and the entirety of the image capturing section 312 may be controllable.

Further, such control of the projection section 311 and such control of the image capturing section 312 may be performed independently. In addition, the position and posture of the projection image capturing apparatus 302 may be controllable. Note that such control of the projection section 311, the image capturing section 312, and the projection image capturing apparatus 302 may be performed by the control apparatus 301, or may be performed by other apparatuses than the control apparatus 301.

The cable 303 is an electric communication cable with optional communication standards, and the electric communication cable may serve as a communication path between the control apparatus 301 and the projection image capturing apparatus 302. Note that as long as the control apparatus 301 and the projection image capturing apparatus 302 can communicate with each other, the control apparatus 301 and the projection image capturing apparatus 302 may be connected to each other via wireless communication, for example. In this case, the cable 303 can be omitted.

In such the projection image capturing system 300, the control apparatus 301 performs corresponding point detection between each projection section 311 and each image capturing section 312 for geometric correction. For example, the control apparatus 301 can perform corresponding point detection by the online-sensing ISL method. In this case, the control apparatus 301 can perform corresponding point detection to which the present technology is applied.

<Control Apparatus>

Figure 21:
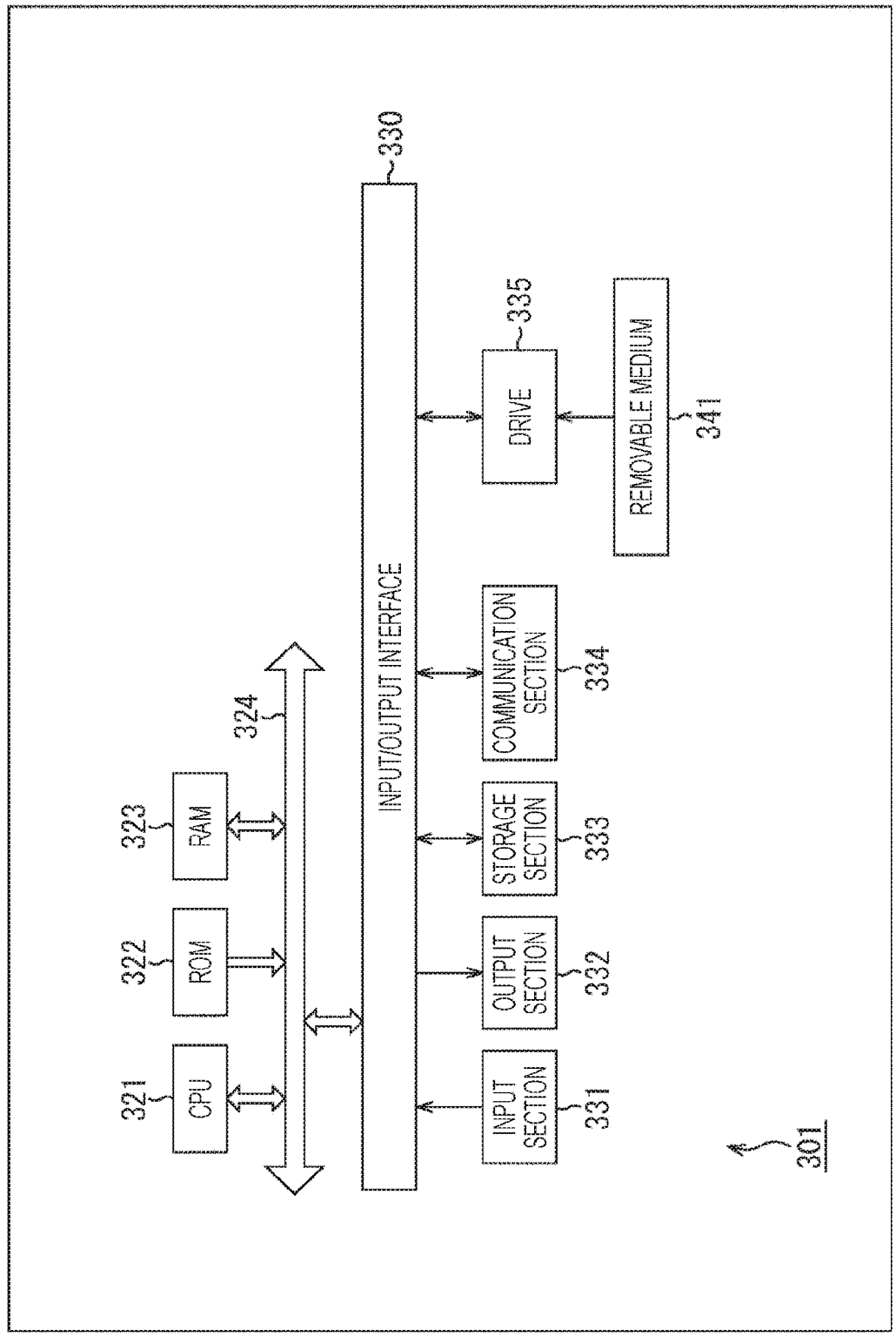
FIG. 21 is a block diagram of a main configuration example of a control apparatus.

FIG. 21 is a block diagram of a main configuration example of the control apparatus 301 as one embodiment of an image processing apparatus to which the present technology is applied.

As illustrated in FIG. 21, the control apparatus 301 has a central processing unit (CPU) 321, a read only memory (ROM) 322, a random access memory (RAM) 323, a bus 324, an input/output interface 330, an input section 331, an output section 332, a storage section 333, a communication section 334, and a drive 335.

The CPU 321, the ROM 322, and the RAM 323 are connected to each other through the bus 324. The input/output interface 330 is also connected to the bus 324. The input section 331, the output section 332, the storage section 333, the communication section 334, and the drive 335 are connected to the input/output interface 330.

The input section 331 includes an input device configured to receive external information such as user input. For example, the input section 331 may include a keyboard, a mouse, an operation button, a touch panel, a camera, a microphone, an input terminal, and the like. Moreover, the input section 331 may include various sensors such as an acceleration sensor, a light sensor, and a temperature sensor and input equipment such as a bar code reader. The output section 332 includes an output device configured to output information such as an image and audio. For example, the output section 332 may include a display, a speaker, an output terminal, and the like.

The storage section 333 includes a storage medium configured to store information such as a program and data. For example, the storage section 333 may include a hard drive, a RAM disk, a non-volatile memory, and the like. The communication section 334 includes a communication device configured to perform communication for exchanging information such as a program and data with an external apparatus through a predetermined communication medium (for example, an optional network such as the Internet). The communication section 334 may include, for example, a network interface. For example, the communication section 334 performs communication (exchange of the program and the data) with the external apparatus of the control apparatus 301. Note that the communication section 334 may have a wired communication function, a wireless communication function, or both.

The drive 335 reads information (a program, data, and the like) stored in a removable medium 341 such as a magnetic disk, an optical disk, a magnetic optical disk, or a semiconductor memory, for example, the removable medium 341 being attached to the drive 335 itself. The drive 335 supplies the information read from the removable medium 341 to the CPU 321, the RAM 323, and the like. Moreover, in a case where the writable removable medium 341 is attached to the drive 335 itself, the drive 335 can store, in the removable medium 341, information (a program, data, and the like) supplied from the CPU 321, the RAM 323, and the like.

The CPU 321 performs, for example, various types of processing in such a manner that the program stored in the storage section 333 is loaded and executed in the RAM 323 through the input/output interface 330 and the bus 324. Moreover, in the RAM 323, data necessary for executing various types of processing by the CPU 321 and the like is also stored as necessary.

The CPU 321 executes the program and the like as described above so that processing regarding corresponding point detection, for example, the processing described in <1. ISL Method and Invisibility of Pattern> can be performed.

<Functional Blocks of Control Apparatus>

Figure 22:
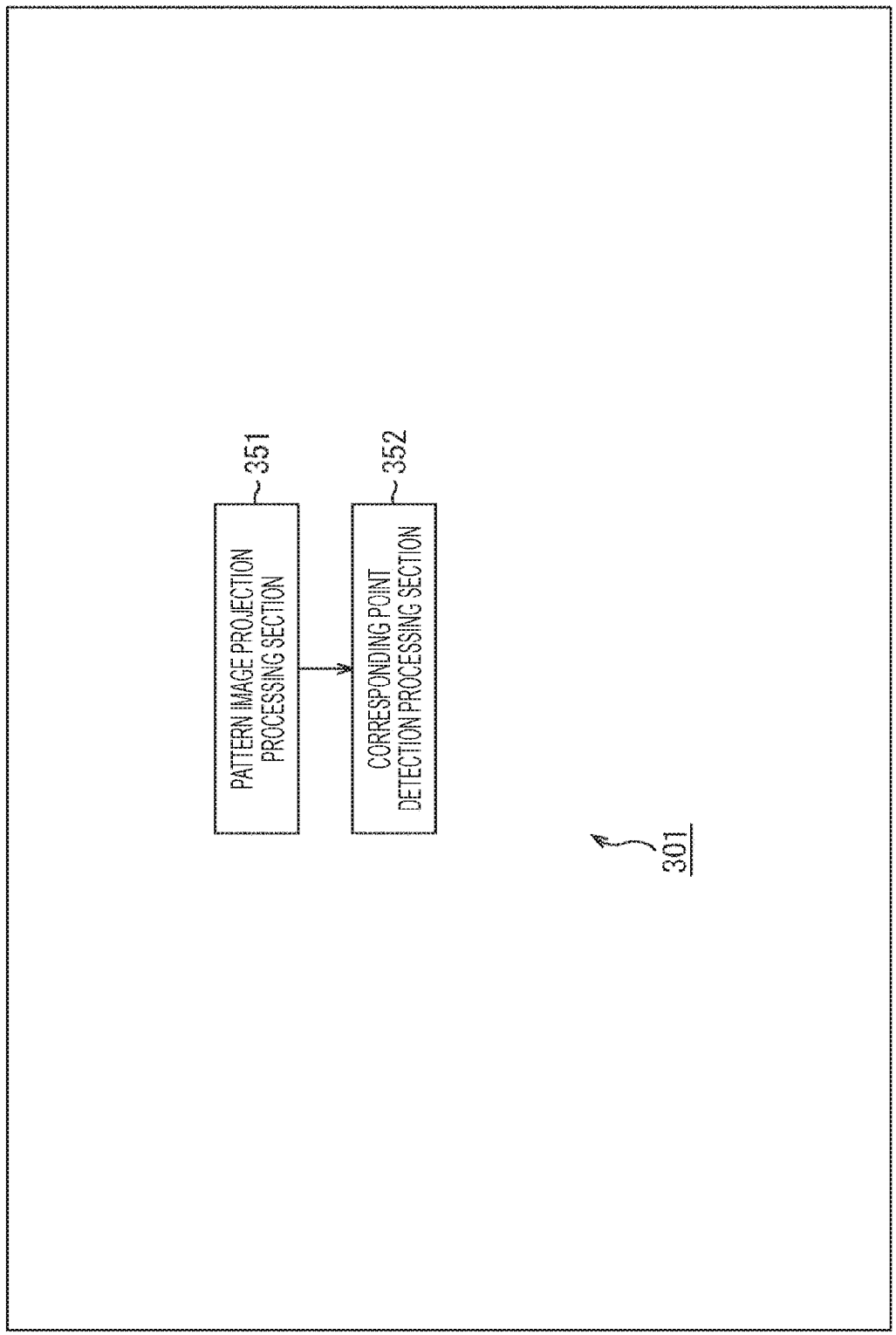
FIG. 22 is a functional block diagram of function examples implemented by the control apparatus.

FIG. 22 is a functional block diagram of function examples implemented in such a manner that the control apparatus 301 executes the program and the like. As illustrated in FIG. 22, the control apparatus 301 has, by execution of the program, functions of a pattern image projection processing section 351 and a corresponding point detection processing section 352, for example.

The pattern image projection processing section 351 performs processing regarding projection of the pattern image 100. For example, the pattern image projection processing section 351 performs the processing described in <Amplitude Adjustment>, <Luminance Clipping> of <1. ISL Method and Invisibility of Pattern>, and the like. Needless to say, the processing performed by the pattern image projection processing section 351 is optional, and is not limited to these types of processing. The corresponding point detection processing section 352 performs processing regarding corresponding point detection based on a projection image projected by the pattern image projection processing section 351. For example, the corresponding point detection processing section 352 performs the processing described in <Repetition of Pattern Detection> of <1. ISL Method and Invisibility of Pattern> and the like. Needless to say, the processing performed by the corresponding point detection processing section 352 is optional, and is not limited to these types of processing.

Note that these blocks can exchange information (for example, a command, data, and the like) with each other as necessary.

<Pattern Image Projection Processing Section>

Figure 23:
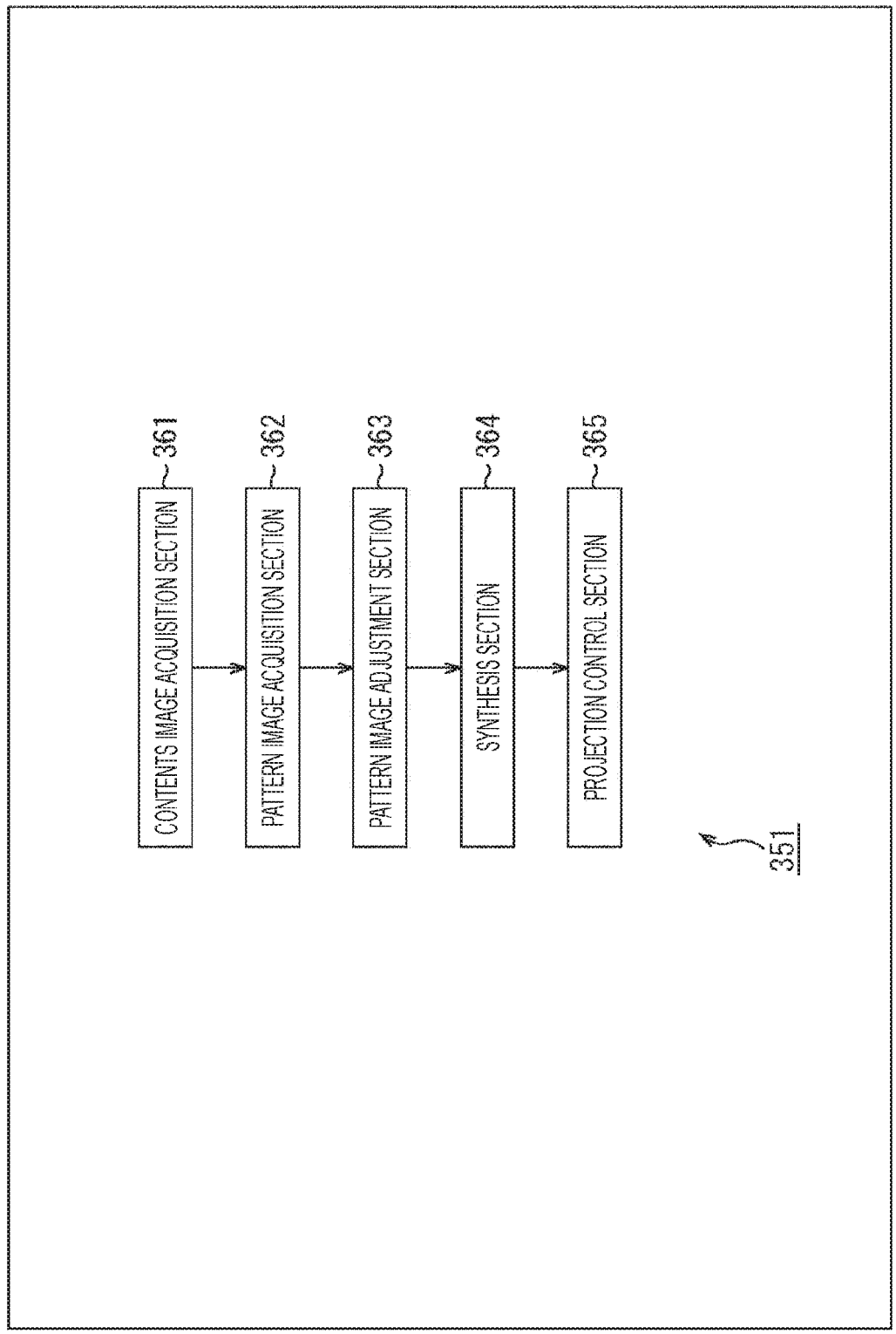
FIG. 23 is a functional block diagram of function examples implemented by a pattern image projection processing section.

Function examples of the pattern image projection processing section 351 are illustrated in FIG. 23. In FIG. 23, the pattern image projection processing section 351 has, for example, functions indicated by functional blocks such as a contents image acquisition section 361, a pattern image acquisition section 362, a pattern image adjustment section 363, a synthesis section 364, and a projection control section 365.

The contents image acquisition section 361 performs processing regarding acquisition of a contents image. The pattern image acquisition section 362 performs processing regarding acquisition of the pattern image. The pattern image adjustment section 363 performs processing regarding adjustment of the amplitude of the pattern image. For example, the pattern image adjustment section 363 performs the processing described in <Amplitude Adjustment>, <Luminance Clipping> of <1. ISL Method and Invisibility of Pattern>, and the like. Needless to say, the processing performed by the pattern image adjustment section 363 is optional, and is not limited to these types of processing. The synthesis section 364 performs processing regarding synthesis of the contents image and the pattern image. The projection control section 365 performs processing regarding control of image projection by the projection image capturing apparatus 302.

Note that these blocks can exchange information (for example, a command, data, and the like) with each other as necessary.

<Pattern Image Adjustment Section>

Figure 24:
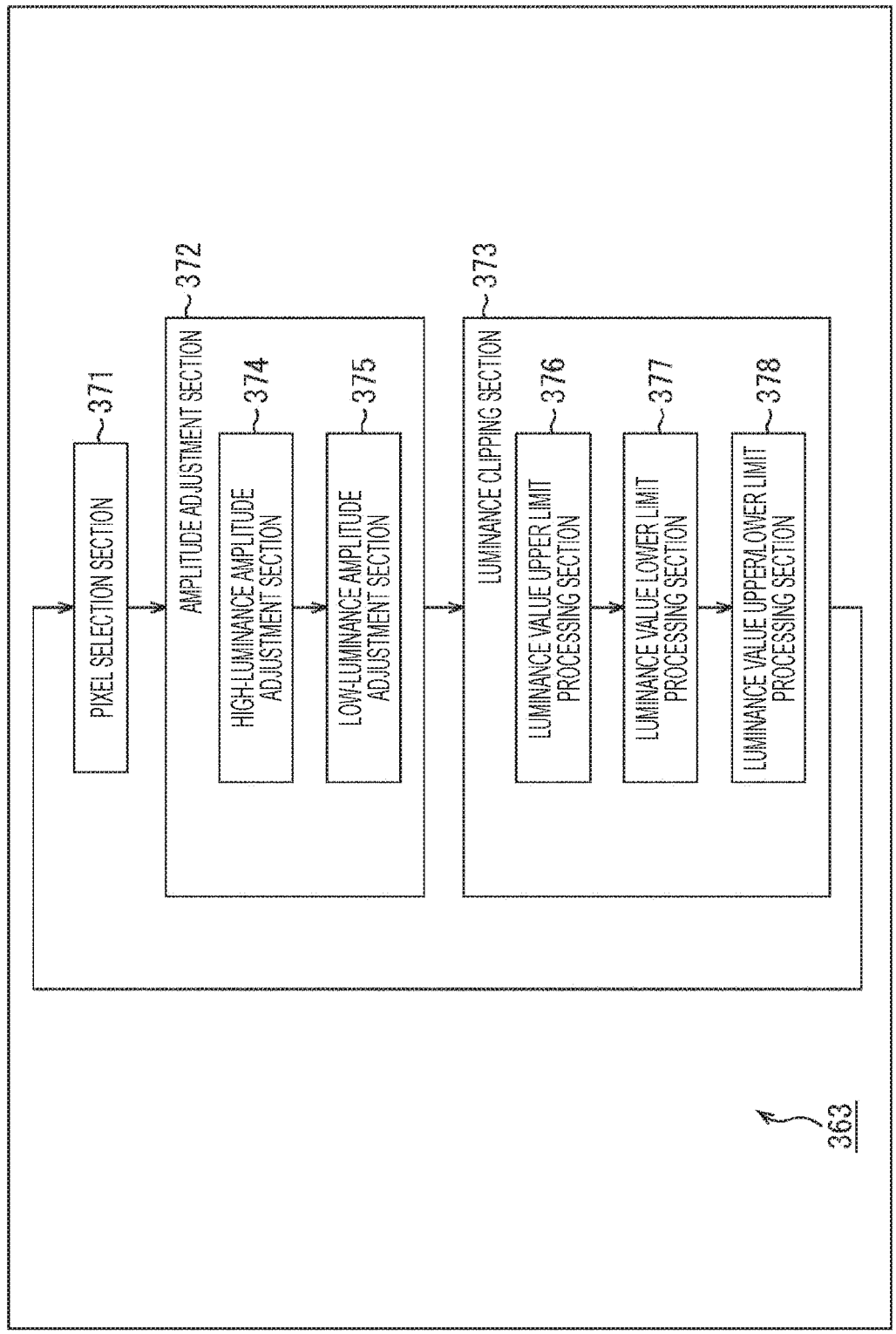
FIG. 24 is a functional block diagram of function examples implemented by a pattern image adjustment section.

Function examples of the pattern image adjustment section 363 are illustrated in FIG. 24. In FIG. 24, the pattern image adjustment section 363 has, for example, functions indicated by functional blocks such as a pixel selection section 371, an amplitude adjustment section 372, and a luminance clipping section 373.

The pixel selection section 371 performs processing regarding selection of a processing target pixel. The amplitude adjustment section 372 performs processing regarding adjustment of the amplitude of a pattern 101 according to the luminance of the contents image. For example, the amplitude adjustment section 372 performs the processing described in <Amplitude Adjustment> of <1. ISL Method and Invisibility of Pattern> and the like. Needless to say, the processing performed by the amplitude adjustment section 372 is optional, and is not limited to this processing. The luminance clipping section 373 performs processing regarding adjustment of the amplitude of the pattern 101 according to a luminance limit and the luminance of the contents image. For example, the luminance clipping section 373 performs the processing described in <Luminance Clipping> of <1. ISL Method and Invisibility of Pattern> and the like. Needless to say, the processing performed by the luminance clipping section 373 is optional, and is not limited to this processing.

As illustrated in FIG. 24, the amplitude adjustment section 372 has, for example, functions indicated by functional blocks such as a high-luminance amplitude adjustment section 374 and a low-luminance amplitude adjustment section 375. The high-luminance amplitude adjustment section 374 performs processing regarding adjustment of the amplitude of the pattern 101 superimposed on a high-luminance contents image. For example, the high-luminance amplitude adjustment section 374 performs the processing described with reference to FIGS. 11 and 13. Needless to say, the processing performed by the high-luminance amplitude adjustment section 374 is optional, and is not limited to this processing. The low-luminance amplitude adjustment section 375 performs processing regarding adjustment of the amplitude of the pattern 101 superimposed on a low-luminance contents image. For example, the low-luminance amplitude adjustment section 375 performs the processing described with reference to FIGS. 12 and 13. Needless to say, the processing performed by the low-luminance amplitude adjustment section 375 is optional, and is not limited to this processing.

Moreover, as illustrated in FIG. 24, the luminance clipping section 373 has, for example, functions indicated by functional blocks such as a luminance value upper limit processing section 376, a luminance value lower limit processing section 377, and a luminance value upper/lower limit processing section 378. The luminance value upper limit processing section 376 performs processing regarding adjustment of the amplitude of the pattern 101 regarding the luminance upper limit. For example, the luminance value upper limit processing section 376 performs the processing described with reference to FIG. 14. Needless to say, the processing performed by the luminance value upper limit processing section 376 is optional, and is not limited to this processing. The luminance value lower limit processing section 377 performs processing regarding adjustment of the amplitude of the pattern 101 regarding the luminance lower limit. For example, the luminance value lower limit processing section 377 performs the processing described with reference to FIG. 15. Needless to say, the processing performed by the luminance value lower limit processing section 377 is optional, and is not limited to this processing. The luminance value upper/lower limit processing section 378 performs processing regarding adjustment of the amplitude of the pattern 101 regarding the luminance upper limit and the luminance lower limit. For example, the luminance value upper/lower limit processing section 378 performs the processing described with reference to FIGS. 16 and 17. Needless to say, the processing performed by the luminance value upper/lower limit processing section 378 is optional, and is not limited to this processing.

Note that these blocks can exchange information (for example, a command, data, and the like) with each other as necessary.

<Corresponding Point Detection Processing Section>

Figure 25:
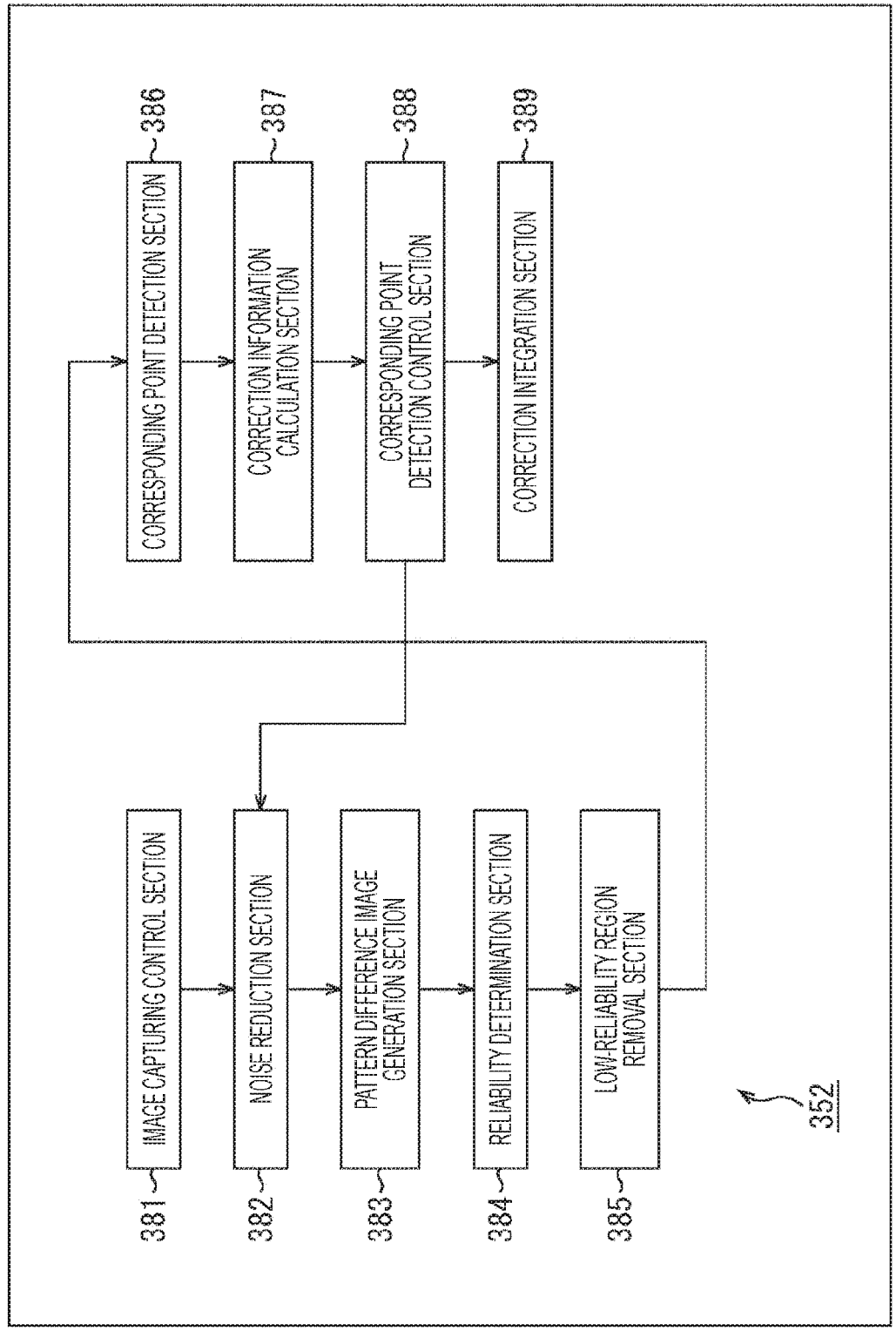
FIG. 25 is a functional block diagram of function examples implemented by a corresponding point detection processing section.

Function examples of the corresponding point detection processing section 352 are illustrated in FIG. 25. In FIG. 25, the corresponding point detection processing section 352 has, for example, functions indicated by functional blocks such as an image capturing control section 381, a noise reduction section 382, a pattern difference image generation section 383, a reliability determination section 384, a low-reliability region removal section 385, a corresponding point detection section 386, a correction information calculation section 387, a corresponding point detection control section 388, and a correction integration section 389.

The image capturing control section 381 performs processing regarding control of image capturing by the projection image capturing apparatus 302. The noise reduction section 382 performs processing regarding noise reduction of the captured image. The pattern difference image generation section 383 performs processing regarding detection of the pattern 101. The reliability determination section 384 performs processing regarding determination of the reliability of the pattern. The low-reliability region removal section 385 performs processing regarding removal of a low-reliability pattern detection result. The corresponding point detection section 386 performs processing regarding corresponding point detection. The correction information calculation section 387 performs processing regarding calculation of correction information. The corresponding point detection control section 388 performs processing regarding control of corresponding point detection. The correction integration section 389 performs processing regarding integration of the correction information.

Note that these blocks can exchange information (for example, a command, data, and the like) with each other as necessary. These processing sections perform the processing described with reference to FIGS. 18 and 19, for example. Needless to say, the processing performed by these processing sections is optional, and is not limited to this processing.

<Projection Image Capturing Apparatus>

Figure 26:
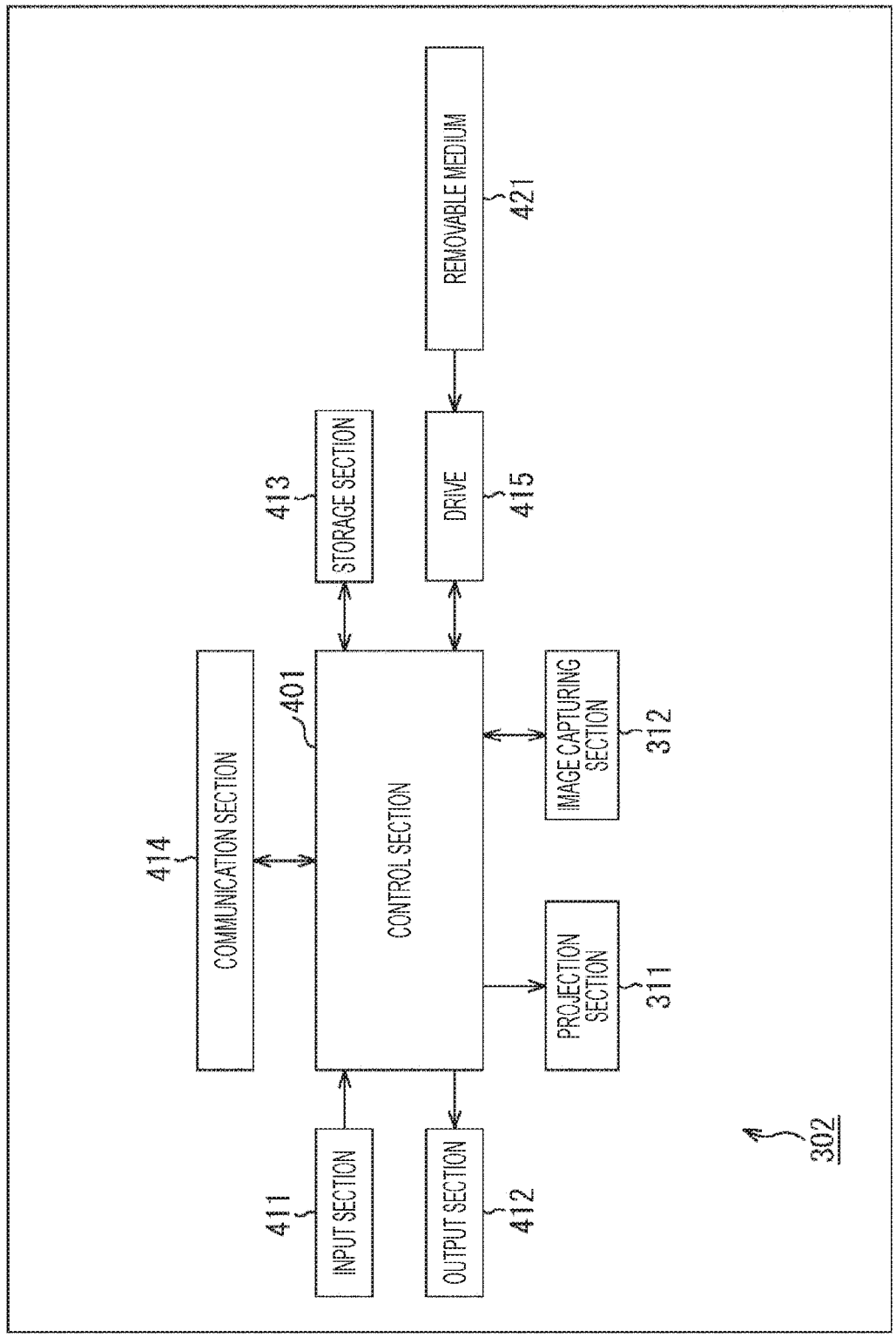
FIG. 26 is a block diagram of a main configuration example of a projection image capturing apparatus.

FIG. 26 is a block diagram of a main configuration example of the projection image capturing apparatus 302. As illustrated in FIG. 26, the projection image capturing apparatus 302 has a control section 401, the projection section 311, the image capturing section 312, an input section 411, an output section 412, a storage section 413, a communication section 414, and a drive 415.

The control section 401 has, for example, a CPU, a ROM, a RAM, and the like. The control section 401 controls each processing section in the apparatus, and, for example, executes various types of processing necessary for such control, such as image processing. The control section 401 performs these types of processing on the basis of the control of the control apparatus 301, for example.

The projection section 311 is controlled by the control section 401, and performs processing regarding image projection. For example, the projection section 311 projects, on the outside (for example, the projection surface and the like) of the projection image capturing apparatus 302, an image supplied from the control section 401. The projection section 311 uses a laser beam as a light source, and uses a micro electro mechanical systems (MEMS) mirror to scan the laser beam to project the image. Needless to say, the light source of the projection section 311 is optional, and is not limited to the laser beam. For example, the light source may be a light emitting diode (LED), xenon, or the like.

The image capturing section 312 is controlled by the control section 401, and captures an image of an object outside the apparatus (for example, the projection surface and the like) to generate the captured image to supply the captured image to the control section 401. For example, the image capturing section 312 captures the projection image projected on the projection surface by the projection section 311. The image capturing section 312 has, for example, an image sensor using a complementary metal oxide semiconductor (CMOS), an image sensor using a charge coupled device (CCD) and the like. The image capturing section 312 photoelectrically converts, by such an image sensor, light from the object to generate an electric signal (data) of the captured image.

The input section 411 includes an input device configured to receive external information such as user input. For example, the input section 411 may include an operation button, a touch panel, a camera, a microphone, an input terminal, and the like. Moreover, the input section 411 may include various sensors such as a light sensor and a temperature sensor. The output section 412 includes an output device configured to output information such as an image and audio. For example, the output section 412 may include a display, a speaker, an output terminal, and the like.

The storage section 413 includes, for example, a hard drive, a RAM disk, a non-volatile memory, and the like. The communication section 414 includes, for example, a network interface. For example, the communication section 414 is connected to the communication cable 303, and can perform communication with the control apparatus 301 connected through the communication cable 303. Note that the communication section 414 may have a wired communication function, a wireless communication function, or both. The drive 415 drives, for example, a removable medium 421 such as a magnetic disk, an optical disk, a magnetic optical disk, or a semiconductor memory.

<Projection Section>

Figure 27:
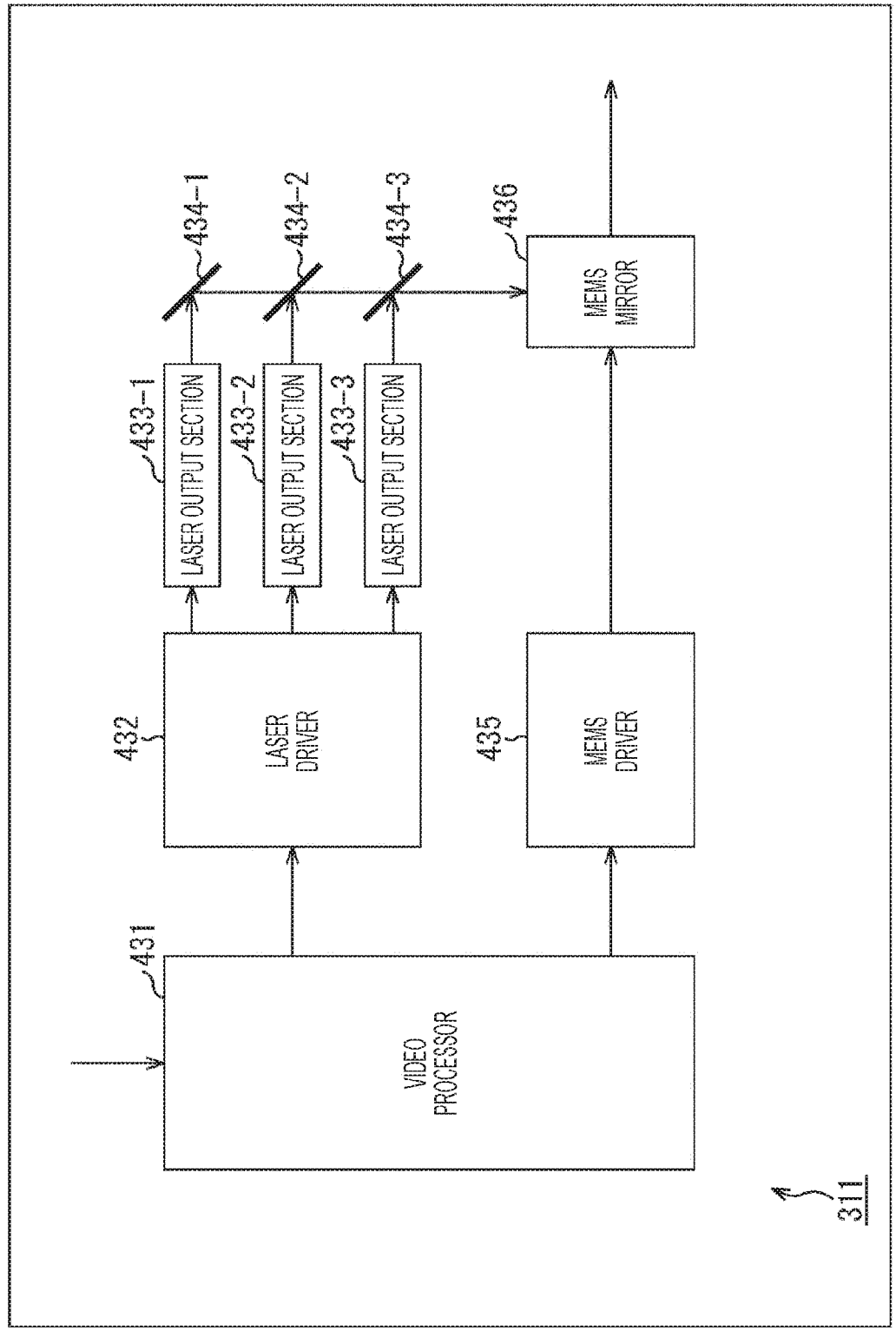
FIG. 27 is a block diagram of a main configuration example of a projection section.

FIG. 27 is a block diagram of a main configuration example of the projection section 311. As illustrated in FIG. 27, the projection section 311 has a video processor 431, a laser driver 432, a laser output section 433-1, a laser output section 433-2, a laser output section 433-3, a mirror 434-1, a mirror 434-2, a mirror 434-3, a MEMS driver 435, and a MEMS mirror 436.

The video processor 431 holds the image supplied from the control section 401, and performs image processing necessary for such an image. The video processor 431 supplies the image to be projected to the laser driver 432 and the MEMS driver 435.

The laser driver 432 controls the laser output section 433-1 to the laser output section 433-3 such that the image supplied from the video processor 431 is projected. The laser output section 433-1 to the laser output section 433-3 output, for example, laser beams in different colors (wavelength bands) such as red, blue, and green. That is, the laser driver 432 controls laser output in each color such that the image supplied from the video processor 431 is projected. Note that in a case where it is not necessary to distinctively describe the laser output section 433-1 to the laser output section 433-3, these sections will be referred to as a "laser output section 433".

The mirror 434-1 reflects the laser beam output from the laser output section 433-1 to guide such a laser beam to the MEMS mirror 436. The mirror 434-2 reflects the laser beam output from the laser output section 433-2 to guide such a laser beam to the MEMS mirror 436. The mirror 434-3 reflects the laser beam output from the laser output section 433-3 to guide such a laser beam to the MEMS mirror 436. Note that in a case where it is not necessary to distinctively describe the mirror 434-1 to the mirror 434-3, these mirrors will be referred to as a "mirror 434".

Figure 28:
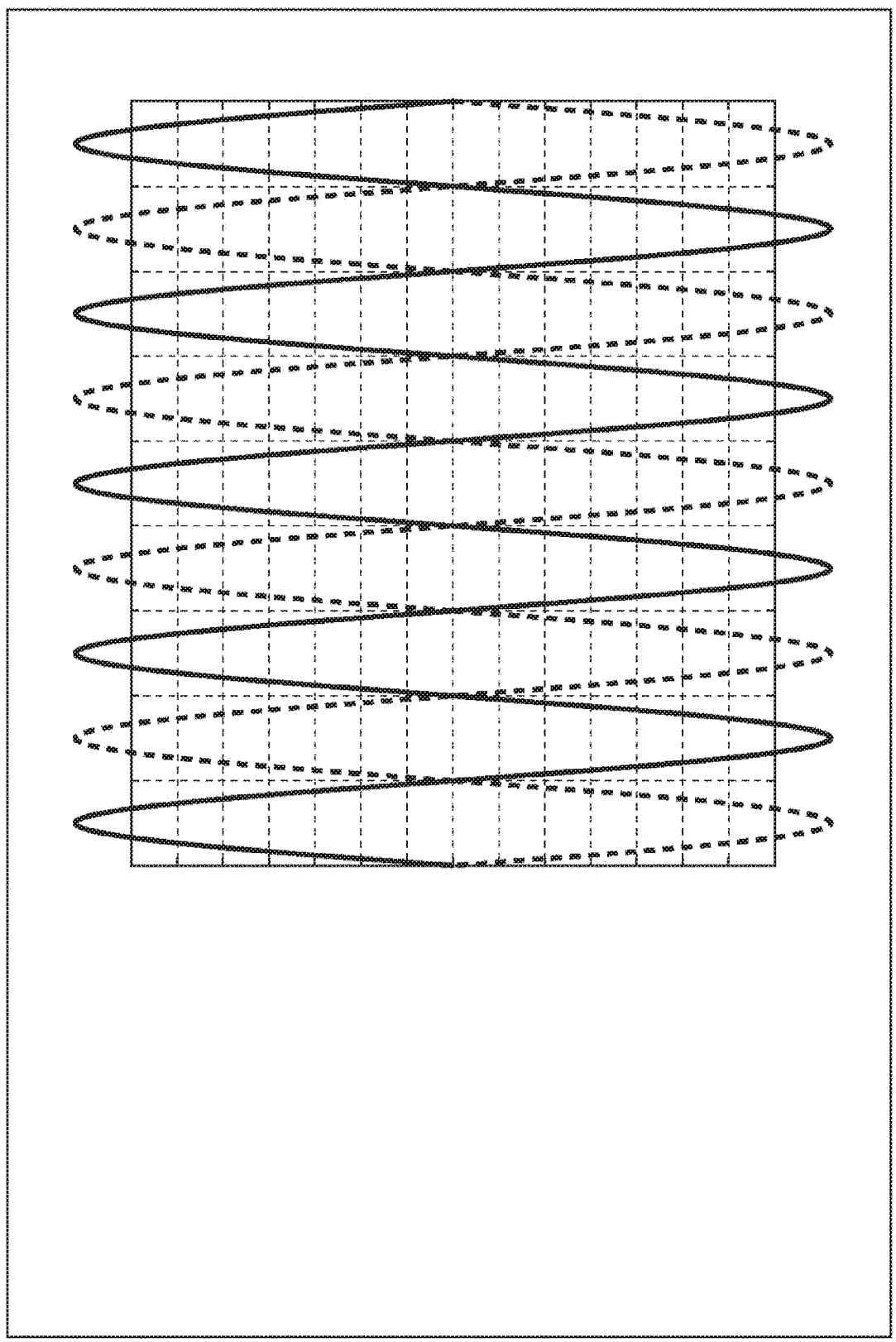
FIG. 28 is a view of an example of scanning with a laser beam.

The MEMS driver 435 controls drive of the MEMS mirror 436 such that the image supplied from the video processor 431 is projected. The MEMS mirror 436 drives a mirror attached onto a MEMS according to the control of the MEMS driver 435, thereby scanning the laser beam in each color as in an example of FIG. 28, for example. Such a laser beam is output from a projection port to the outside of the apparatus, and for example, the projection surface is irradiated with such light. Accordingly, the image projected from the video processor 431 is projected on the projection surface.

Note that in the example of FIG. 27, it has been described that three laser output sections 433 are provided and the laser beams in three colors are output, but the number of laser beams (or the number of colors) is optional. For example, four or more laser output sections 433 may be provided, or two or less laser output sections 433 may be provided. That is, the laser beams output from the projection image capturing apparatus 302 (the projection section 311) may be two or less or four or more. Moreover, the number of colors of the laser beams output from the projection image capturing apparatus 302 (the projection section 311) is also optional, and may be two or lessor four or more. Further, configurations of the mirror 434 and the MEMS mirror 436 are also optional, and are not limited to those of the example of FIG. 27. Needless to say, a laser beam scanning pattern is optional.

<Flow of Geometric Correction Processing>

Next, processing executed in the projection image capturing system 300 configured as described above will be described. As described above, in the projection image capturing system 300, the control apparatus 301 controls each projection image capturing apparatus 302, and by the online-sensing ISL method, an image such as contents is projected while the corresponding point between each projection section 311 and each image capturing section 312 is being detected. On the basis of such a corresponding point, estimation of the postures of each projection section and each image capturing section 312, projection surface formation, and the like are performed, and geometric correction for the image to be projected is performed.

An example of the flow of the geometric correction processing executed in the control apparatus 301 for executing these types of processing will be described with reference to a flowchart of FIG. 29.

When the geometric correction processing begins, the pattern image projection processing section 351 of the control apparatus 301 executes, at step S101, pattern image projection processing to control the projection image capturing apparatus 302, thereby performing processing regarding projection of a structuring light pattern. Although described later in detail, this processing regarding projection of the structuring light pattern includes, for example, the processing described in <Amplitude Adjustment>, <Luminance Clipping> of <1. ISL Method and Invisibility of Pattern>, and the like.

At step S102, the corresponding point detection processing section 352 executes corresponding point detection processing to control the projection image capturing apparatus 302, thereby capturing the projection image projected by the processing of step S101. Moreover, the corresponding point detection processing section 352 detects the corresponding point on the basis of the captured image, and generates the correction information by geometric correction and the like. Although described later in detail, this corresponding point detection processing includes, for example, the processing described in <Repetition of Pattern Detection> of <1. ISL Method and Invisibility of Pattern> and the like.

When the processing of step S102 ends, the geometric correction processing ends. The control apparatus 301 executes this geometric correction processing for all combinations of the projection section 311 and the image capturing section 312.

<Flow of Pattern Image Projection Processing>

Next, an example of the flow of the pattern image projection processing executed at step S101 of FIG. 29 will be described with reference to a flowchart of FIG. 30.

When the pattern image projection processing begins, the contents image acquisition section 361 of the pattern image projection processing section 351 acquires, at step S121, the contents image projected from the projection image capturing apparatus 302. At step S122, the pattern image acquisition section 362 acquires the pattern image 100 (a positive image 100-1 and a negative image 100-2) projected in a superimposed state on the contents image acquired at step S121.

At step S123, the pattern image adjustment section 363 executes pattern image adjustment processing to adjust the pattern image according to the luminance. Although described later in detail, this pattern image adjustment processing includes the processing described in, for example, <Amplitude Adjustment>, <Luminance Clip> of <1. ISL Method and Invisibility of Pattern>, and the like. At step S124, the synthesis section 364 synthesizes the pattern image adjusted as necessary by the processing of step S123 with the contents image.

At step S125, the projection control section 365 supplies the synthetic image generated by the processing of step S124 to the projection image capturing apparatus 302 to project such an image. When the processing of step S125 ends, the pattern image projection processing ends, and the processing returns to FIG. 29.

<Flow of Pattern Image Adjustment Processing>

Next, an example of the flow of the pattern image adjustment processing executed at step S123 of FIG. 30 will be described with reference to a flowchart of FIG. 31.

When the pattern image adjustment processing begins, the pixel selection section 371 of the pattern image adjustment section 363 selects the processing target pixel at step S141. At step S142, the amplitude adjustment section 372 executes amplitude adjustment processing to adjust, for the processing target pixel of the pattern image 100, the amplitude of the pattern 101 according to the luminance of the contents image. Although described later in detail, this amplitude adjustment processing includes the processing described in, for example, <Amplitude Adjustment> of <1. ISL Method and Invisibility of Pattern> and the like.

At step S143, the luminance clipping section 373 executes luminance clipping processing to adjust, for the processing target pixel of the pattern image 100, the amplitude of the pattern 101 on the basis of the luminance of the contents image and the luminance limit. Although described later in detail, this luminance clipping processing includes the processing described in, for example, <Luminance Clipping> of <1. ISL Method and Invisibility of Pattern> and the like.

At step S144, the pixel selection section 371 determines whether or not all pixels have been processed. In a case where it is determined that unprocessed pixels are present, the processing returns to step S141 to select a new processing target pixel and repeat subsequent processing.

Figure 30:
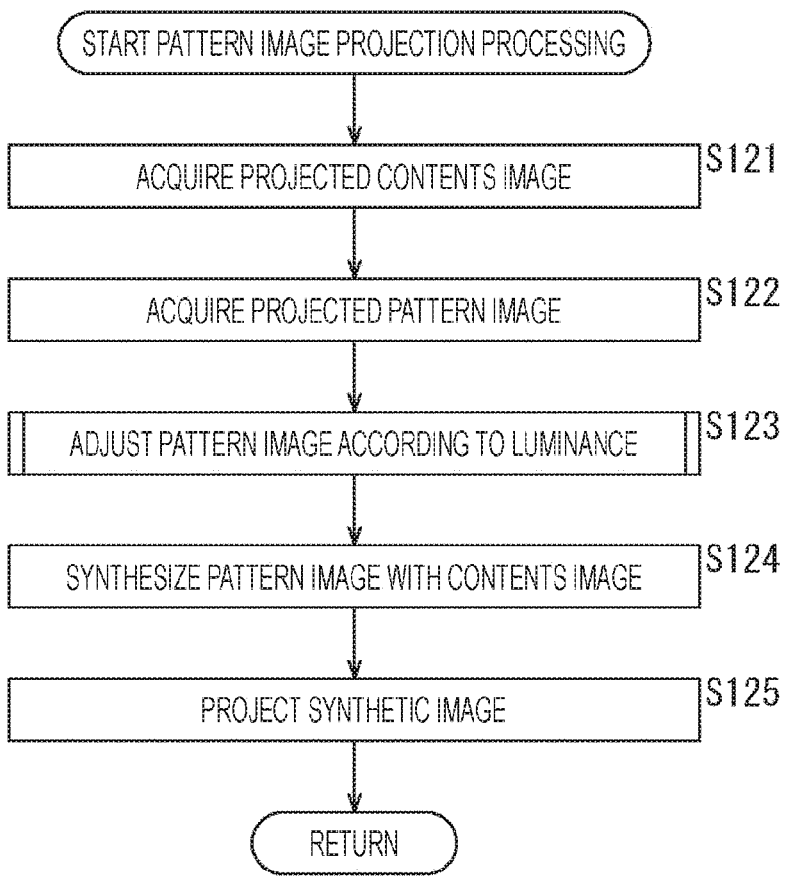
FIG. 30 is a flowchart for describing an example of the flow of pattern image projection processing.

Then, at step S144, in a case where it is determined that all pixels have been processed, the pattern image adjustment processing ends, and the processing returns to FIG. 30.

<Flow of Amplitude Adjustment Processing>

Next, an example of the flow of the amplitude adjustment processing executed at step S142 of FIG. 31 will be described with reference to a flowchart of FIG. 32.

When the amplitude adjustment processing begins, the high-luminance amplitude adjustment section 374 adjusts, at step S161, the amplitude of the pattern image (for example, the pattern 101) superimposed on the high-luminance contents image. For example, the high-luminance amplitude adjustment section 374 adjusts the amplitude of the pattern image by the method described with reference to FIG. 11 and the like.

At step S162, the low-luminance amplitude adjustment section 375 adjusts the amplitude of the pattern image (for example, the pattern 101) superimposed on the low-luminance contents image. For example, the low-luminance amplitude adjustment section 375 adjusts the amplitude of the pattern image by the method described with reference to FIG. 12 and the like. When the processing of step S162 ends, the amplitude adjustment processing ends, and the processing returns to FIG. 31.

<Flow of Luminance Clipping Processing>

Figure 33:
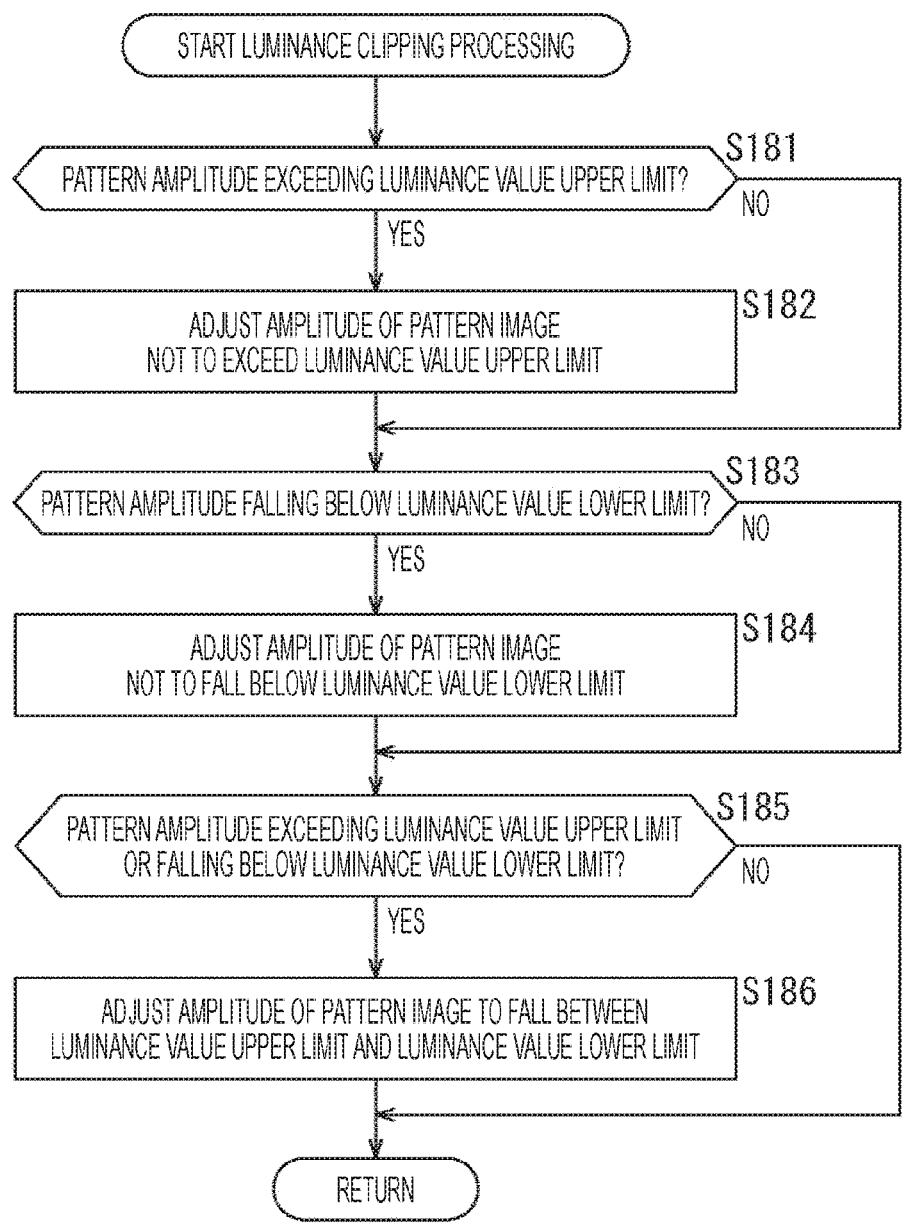
FIG. 33 is a flowchart for describing an example of the flow of luminance clipping processing.

Next, an example of the flow of the luminance clipping processing executed at step S143 of FIG. 31 will be described with reference to a flowchart of FIG. 33.

When the luminance clipping processing begins, the luminance value upper limit processing section 376 determines, at step S181, whether or not the amplitude of the processing target pixel of the pattern 101 superimposed on the contents image exceeds the luminance value upper limit. In a case where the luminance value of the pattern 101 in a positive direction is added to the luminance value of the contents image and it is determined that the result exceeds the luminance value upper limit, the processing proceeds to step S182.

At step S182, the luminance value upper limit processing section 376 adjusts the amplitude of the pattern image (for example, the pattern 101) such that such an addition result does not exceed the luminance value upper limit. For example, the luminance value upper limit processing section 376 adjusts, by the method described with reference to FIG. 14 and the like, the amplitude of the pattern image such that the addition result does not exceed the luminance value upper limit.

When the processing of step S182 ends, the processing proceeds to step S183. Moreover, in a case where it is, at step S181, determined that the result of addition of the luminance value of the contents image and the luminance of the pattern 101 in the positive direction does not exceed the luminance value upper limit, the processing of step S182 is omitted, and the processing proceeds to step S183.

Ate step S183, the luminance value lower limit processing section 377 determines whether or not the amplitude of the processing target pixel of the pattern 101 superimposed on the contents image falls below the luminance value lower limit. In a case where the luminance of the pattern 101 in a negative direction is subtracted from the luminance value of the contents image and it is determined that the result falls below the luminance value lower limit, the processing proceeds to step S184.

At step S184, the luminance value lower limit processing section 377 adjusts the amplitude of the pattern image (for example, the pattern 101) such that such a subtraction result does not fall below the luminance value lower limit. For example, the luminance value lower limit processing section 377 adjusts, by the method described with reference to FIG. 15 and the like, the amplitude of the pattern image such that the subtraction result does not fall below the luminance value lower limit.

When the processing of step S184 ends, the processing proceeds to step S185. Moreover, in a case where it is, at step S183, determined that the result of subtraction of the luminance of the pattern 101 in the negative direction from the luminance value of the contents image does not fall below the luminance value lower limit, the processing of step S184 is omitted, and the processing proceeds to step S185.

At step S185, the luminance value upper/lower limit processing section 378 determines whether or not the amplitude of the processing target pixel of the pattern 101 superimposed on the contents image exceeds the luminance value upper limit or falls below the luminance value lower limit or the amplitude does not exceed the luminance value upper limit and does not fall below the luminance value lower limit. In a case where the luminance of the pattern 101 in the positive direction is added to the luminance value of the contents image and it is determined that the result falls below the luminance value lower limit or in a case where the luminance of the pattern 101 in the negative direction is subtracted from the luminance value of the contents image and it is determined that the result falls below the luminance value lower limit, the processing proceeds to step S186.

At step S186, the luminance value upper/lower limit processing section 378 adjusts the amplitude of the pattern image (for example, the pattern 101) such that the result of addition of the luminance value of the contents image and the luminance of the pattern 101 in the positive direction and the result of subtraction of the luminance of the pattern 101 in the negative direction from the luminance value of the contents image fall between the luminance value upper limit and the luminance value lower limit. For example, the luminance value upper/lower limit processing section 378 adjusts, by the methods described with reference to FIGS. 16, 17, and the like, the amplitude of the pattern image such that the above-described addition result and the above-described subtraction result fall between the luminance value upper limit and the luminance value lower limit.

Figure 31:
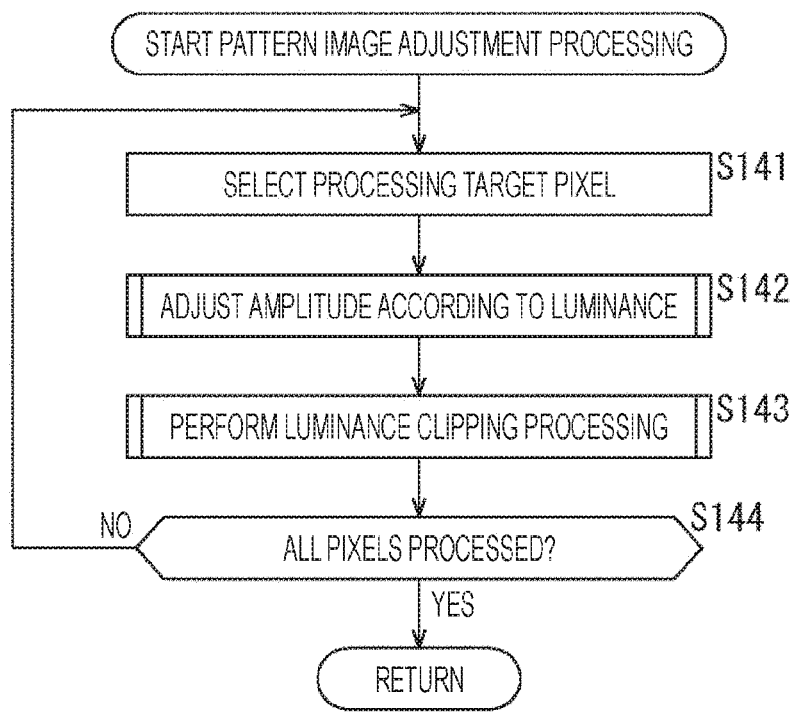
FIG. 31 is a flowchart for describing an example of the flow of pattern image adjustment processing.
Figure 32:
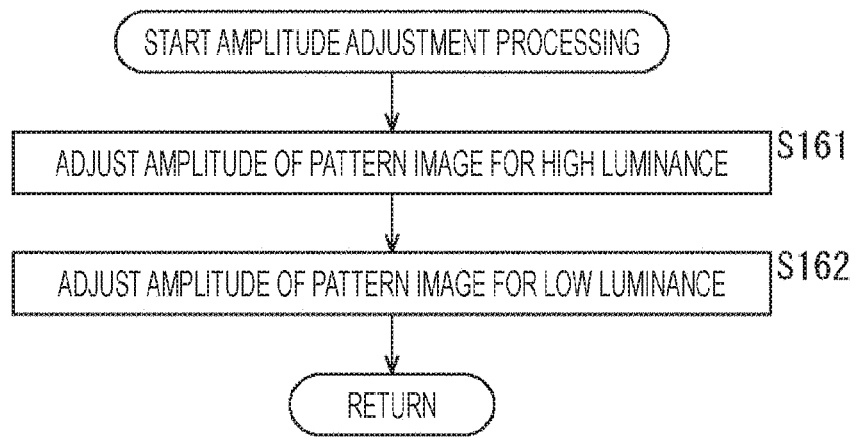
FIG. 32 is a flowchart for describing an example of the flow of amplitude adjustment processing.

When the processing of step S186 ends, the luminance clipping processing ends, and the processing returns to FIG. 31. Moreover, at step S185, in a case where it is determined that the result of addition of the luminance value of the contents image and the luminance of the pattern 101 in the positive direction does not exceed the luminance value upper limit and the result of subtraction of the luminance of the pattern 101 in the negative direction from the luminance value of the contents image does not fall below the luminance value lower limit, the processing of step S186 is omitted. The luminance clipping processing ends, and the processing returns to FIG. 31.

<Flow of Corresponding Point Detection Processing>

Figure 34:
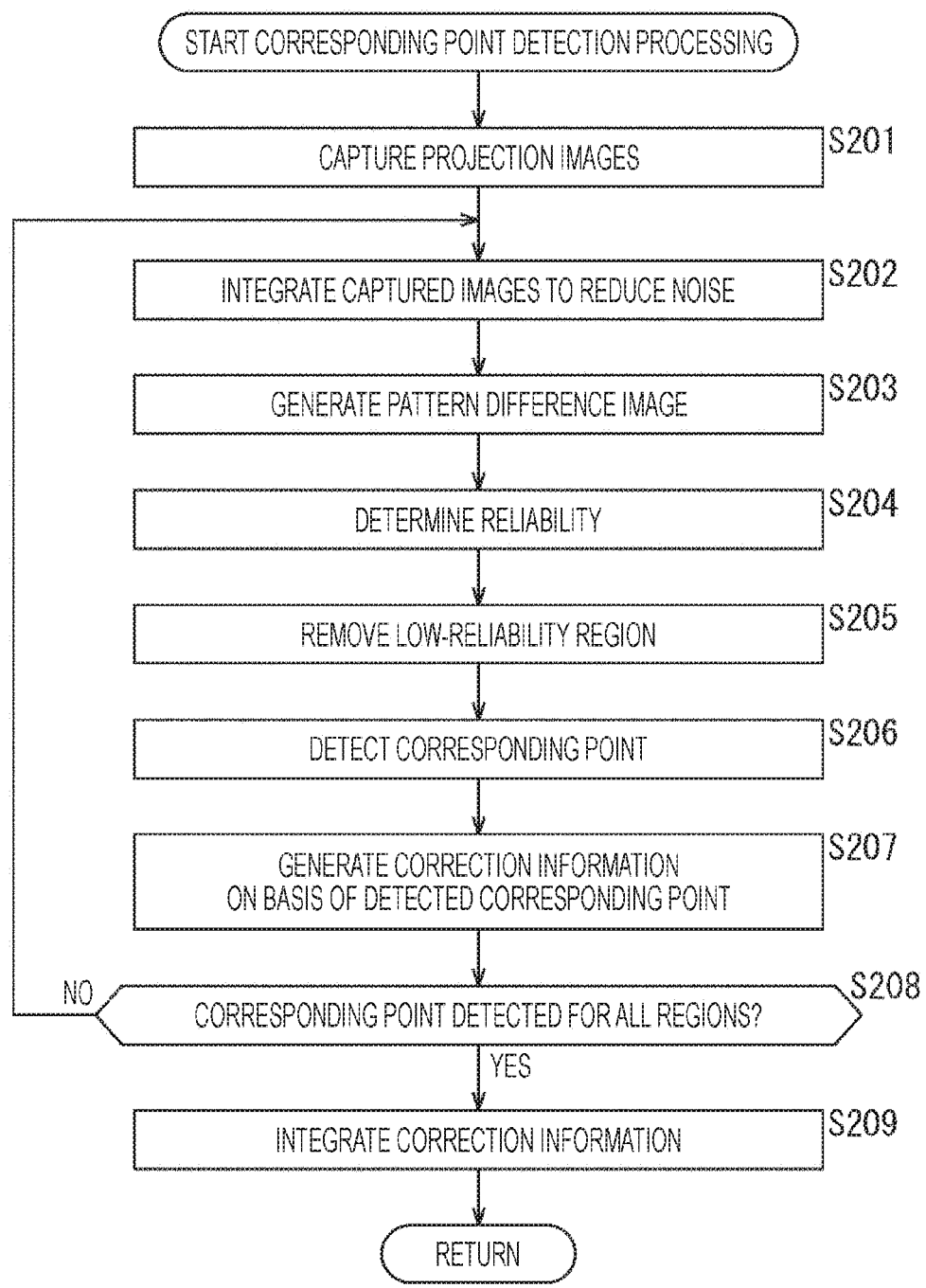
FIG. 34 is a flowchart for describing an example of the flow of corresponding point detection processing.

Next, an example of the flow of the corresponding point detection processing executed at step S102 of FIG. 29 will be described with reference to a flowchart of FIG. 34.

Figure 29:
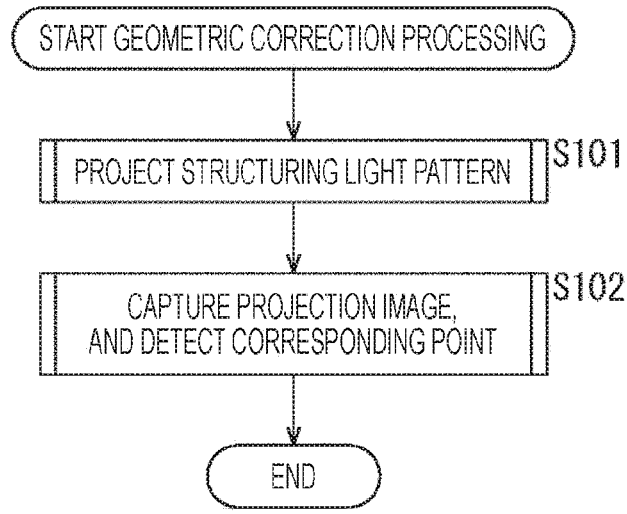
FIG. 29 is a flowchart for describing an example of the flow of geometric correction processing.

When the corresponding point detection processing begins, the image capturing control section 381 captures, by the pattern image projection processing of step S101 of FIG. 29, the projection image projected from the projection section 311 of the target for the pattern image projection processing at step S201. This projection image is a projection image of such a synthetic image that the pattern image 100 whose amplitude has been adjusted as necessary is superimposed on the contents image. The image capturing control section 381 controls the image capturing section 312 of the target for the corresponding point detection processing to capture the projection image. The image capturing control section 381 captures a necessary number of frames of the projection images to obtain a necessary number of captured images.

At step S202, the noise reduction section 382 integrates, among the obtained captured images, the captured images of the projection images of the contents images on which the same type of pattern image (the positive image or the negative image) is superimposed, thereby reducing noise of the captured image (improving a S/N ratio).

At step S203, the pattern difference image generation section 383 generates a difference image (also referred to as a "pattern difference image") between the captured image of the projection image of the synthetic image of the positive image and the contents image and the captured image of the projection image of the synthetic image of the negative image and the contents image. This pattern difference image is such an image that the contents image is substantially cancelled out and the pattern image is emphasized. That is, the pattern difference image generation section 383 detects the pattern 101 from the captured images.

At step S204, the reliability determination section 384 determines the reliability of the pattern 101 detected from the pattern difference image. The method for determining the reliability is optional. For example, determination may be made on the basis of an amplitude magnitude, a position, a shape, and the like.

At step S205, the low-reliability region removal section 385 sets, on the basis of the determination result of step S204, a region of the pattern difference image where the reliability of the pattern 101 is relatively lower than that of other regions, and removes the pattern 101 in such a region.

At step S206, the corresponding point detection section 386 uses the pattern 101 in a region not removed by the processing of step S205, i.e., the high-reliability pattern 101, to detect the corresponding point between the projection section 311 of the processing target and the image capturing section 312 of the processing target.

At step S207, the correction information calculation section 387 performs processing such as posture estimation, projection screen reconfiguration, and geometric correction on the basis of the corresponding point detected by the processing of step S206 and generates the correction information for correcting the image to be projected, the correction information reflecting these processing results.

At step S208, the corresponding point detection control section 388 determines whether or not the corresponding point has been detected for all regions. In a case where it is determined that the corresponding point is not detected for all regions, the processing returns to step S202, and subsequent processing is repeated.

The processing of steps S202 to S208 is repeated, and the processing proceeds to step S209 in a case where it is, at step S208, determined that the corresponding point has been detected for all regions.

At step S209, the correction integration section 389 integrates the correction information generated at step S207 in each repetition of the processing of steps S202 to S208.

When the processing of step S209 ends, the corresponding point detection processing ends, and the processing returns to FIG. 29. That is, each processing section of the corresponding point detection processing section 352 executes the processing described with reference to FIGS. 18, 19, and the like.

By execution of each type of processing as described above, degradation of the invisibility and detection accuracy of the pattern can be reduced as described in <1. ISL Method and Invisibility of Pattern>.

3. Second Embodiment

<Other Configuration Examples of Projection Image Capturing System and Projection Image Capturing Apparatus>

Figure 35A:
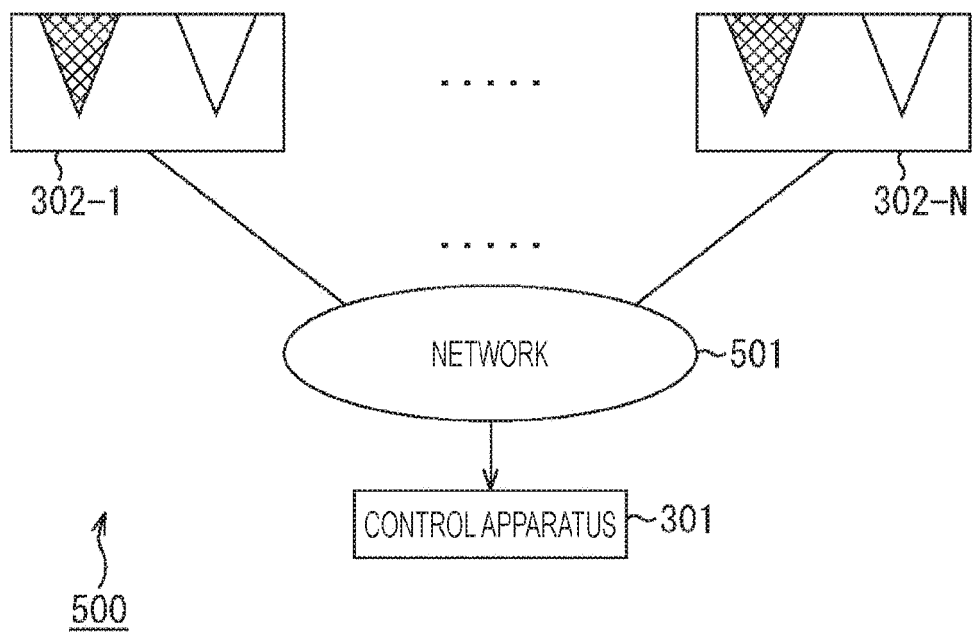
FIGS. 35A and 35B are block diagrams of other configuration examples of the projection image capturing system.

Note that the configuration example of the projection image capturing system to which the present technology is applied is not limited to the above-described example. For example, as in a projection image capturing system 500 illustrated in FIG. 35A, a control apparatus 301 and each projection image capturing apparatus 302 may be connected to each other through a network 501.

The network 501 is an optional communication network. A communication method employed in the network 501 is optional. For example, such a method may be wired communication, wireless communication, or both. Moreover, the network 501 may include a single communication network, or may include multiple communication networks. For example, the network 501 may include communication networks and communication paths according to optional communication standards, such as the Internet, a public phone line network, a wireless mobile wide area communication network such as a so-called 3G or 4G line, a wide area network (WAN), a local area network (LAN), a wireless communication network for communication according to Bluetooth (registered trademark) standards, a near field wireless communication path such as near filed communication (NFC), an infrared communication path, and a wired communication network according to standards such as a high-definition multimedia interface (HDMI) (registered trademark) or a universal serial bus (USB).

The control apparatus 301 and each projection image capturing apparatus 302 are communicably connected to the network 501. Note that such connection may be wired (i.e., connection via wired communication), wireless (i.e., connection via wireless communication), or both. Note that the number of apparatuses of each type, the shape and size of a housing, arrangement positions, and the like are optional.

The control apparatus 301 and each projection image capturing apparatus 302 can communicate (exchange information and the like) with each other through the network 501. In other words, the control apparatus 301 and each projection image capturing apparatus 302 may be communicably connected to each other through other types of equipment (an apparatus, a transmission path, or the like).

In the case of the projection image capturing system 500 configured as described above, the present technology can be also applied similarly in the case of the projection image capturing system 300 described in the first embodiment, and the features and the advantageous effects described above can be provided.

Figure 35B:
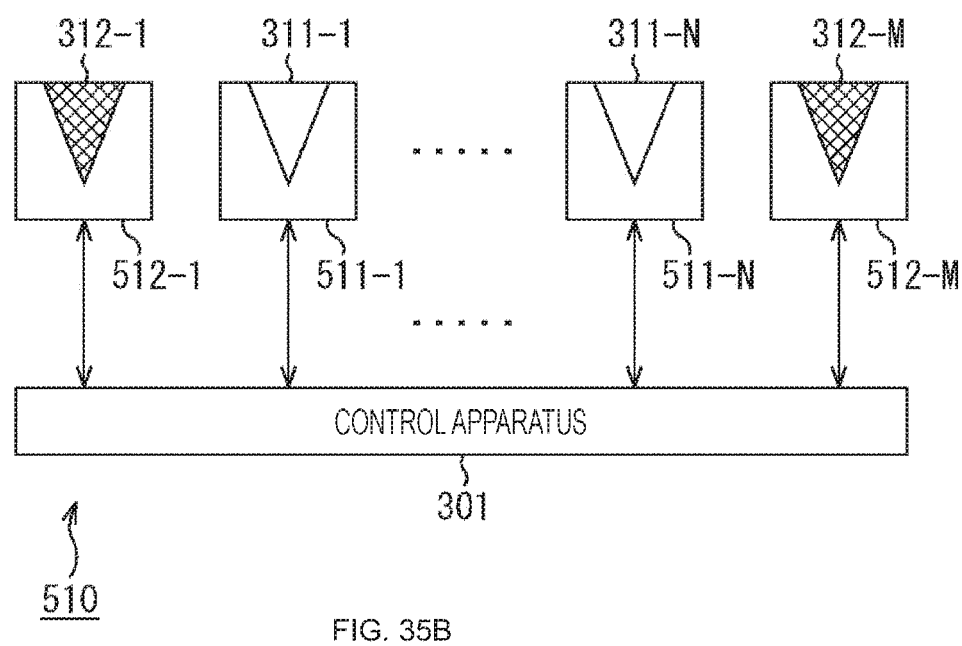

Moreover, as in, for example, a projection image capturing system 510 illustrated in FIG. 35B, projection sections 311 and image capturing sections 312 may be configured as different apparatuses. Instead of the projection image capturing apparatuses 302, the projection image capturing system 510 has a projection apparatus 511-1 to a projection apparatus 511-N(N is an optional natural number) and an image capturing apparatus 512-1 to an image capturing apparatus 512-M (M is an optional natural number). The projection apparatus 511-1 to the projection apparatus 511-N each have the projection sections 311 (a projection section 311-1 to a projection section 311-N) to project images. The image capturing apparatus 512-1 to the image capturing apparatus 512-M each have the image capturing sections 312 (an image capturing section 312-1 to an image capturing section 312-M) to capture projection surface images (the projection images projected by the projection sections 311).

In a case where it is not necessary to distinctively describe the projection apparatus 511-1 to the projection apparatus 511-N, these apparatuses will be referred to as a "projection apparatus 511". In a case where it is not necessary to distinctively describe the image capturing apparatus 512-1 to the image capturing apparatus 512-M, these apparatuses will be referred to as an "image capturing apparatus 512".

Each projection apparatus 511 and each image capturing apparatus 512 are communicably connected to the control apparatus 301 so that communication (information exchange) with the control apparatus 301 can be performed via wired communication, wireless communication, or both. Note that each projection apparatus 511 and each image capturing apparatus 512 may be able to communicate with other projection apparatuses 511, other image capturing apparatuses 512, or both through the control apparatus 301.

Moreover, the number of apparatuses of each type, the shape and size of a housing, arrangement positions, and the like are optional. Further, as in an example of FIG. 35A, the apparatuses may be communicably connected to each other through other types of equipment (an apparatus or a transmission path) such as the network 501.

In the case of the projection image capturing system 510 configured as described above, the present technology can be also applied similarly in the case of the projection image capturing system 300 described in the first embodiment, and the features and the advantageous effects described above can be provided.

Figure 36A:
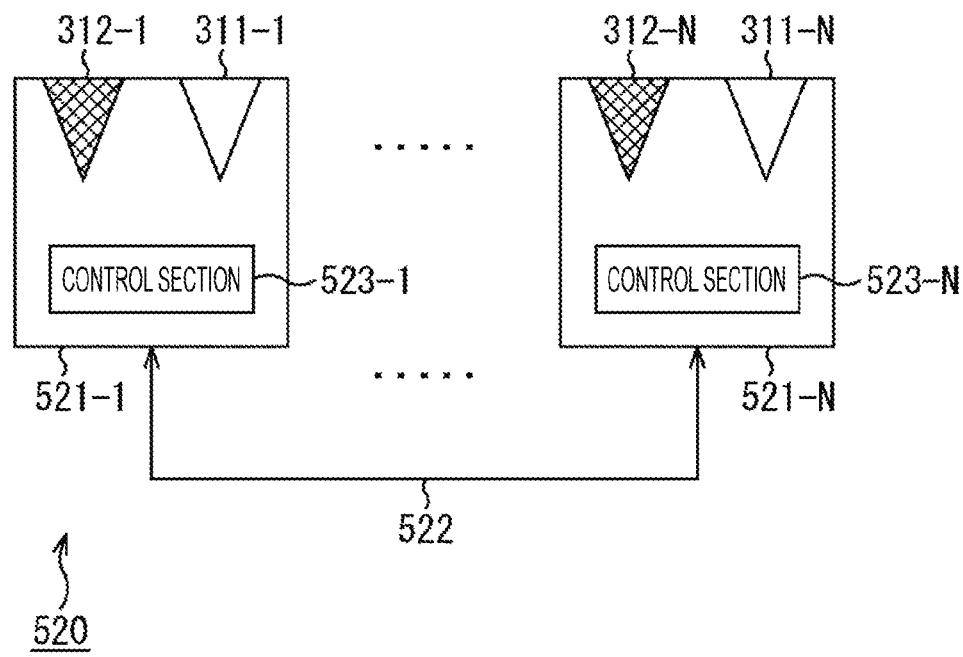
FIGS. 36A and 36B are block diagrams of main configuration examples of the projection image capturing system and the projection image capturing apparatus.

Moreover, as in, for example, a projection image capturing system 520 illustrated in FIG. 36A, the control apparatus 301 may be omitted. As illustrated in FIG. 36A, the projection image capturing system 520 has a projection image capturing apparatus 521-1 to a projection image capturing apparatus 521-N(N is an optional natural number). In a case where it is not necessary to distinctively describe the projection image capturing apparatus 521-1 to the projection image capturing apparatus 521-N, these apparatuses will be referred to as a "projection image capturing apparatus 521". The projection image capturing apparatuses 521 are communicably connected to each other through a communication cable 522. Note that the projection image capturing apparatuses 521 may be communicably connected to each other via wireless communication.

The projection image capturing apparatus 521-1 to the projection image capturing apparatus 521-N each have a control section 523-1 to a control section 523-N. In a case where it is not necessary to distinctively describe the control section 523-1 to the control section 523-N, these sections will be referred to as a "control section 523". The control section 523 has functions similar to those of the control apparatus 301, and can perform similar processing.

That is, in the case of the projection image capturing system 520, the processing performed in the above-described control apparatus 301 is executed in (the control section 523 of) the projection image capturing apparatus 521. Note that any of (the control sections 523 of) the projection image capturing apparatuses 521 may execute all types of processing performed in the control apparatus 301, or (control sections 523 of) multiple projection image capturing apparatuses 521 may cooperate to execute the processing by information exchange and the like.

In the case of the projection image capturing system 520 configured as described above, the present technology can be also applied similarly in the case of the projection image capturing system 300 described in the first embodiment, and the features and the advantageous effects described above can be provided.

Figure 36B:
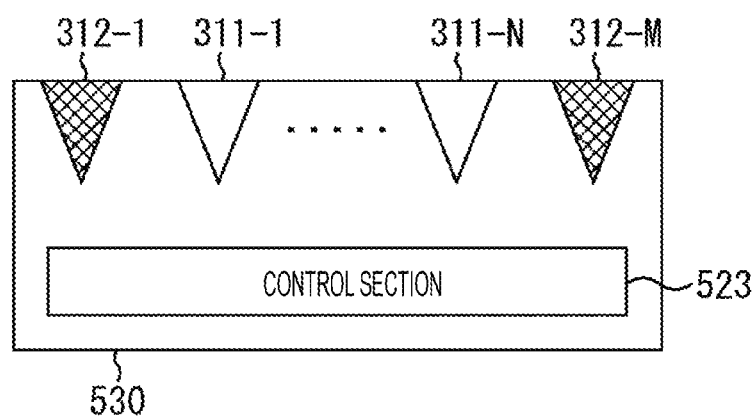

Moreover, as in, for example, FIG. 36B, the projection image capturing system 300 may be configured as a single apparatus. A projection image capturing apparatus 530 illustrated in FIG. 36B has projection sections 311 (a projection section 311-1 to a projection section 311-N(N is an optional natural number)), image capturing sections 312 (an image capturing section 312-1 to an image capturing section 312-M (M is an optional natural number), and a control section 523.

In the projection image capturing apparatus 530, the control section 523 executes the processing performed in the above-described control apparatus 301 to control each projection section 311 and each image capturing section 312 for corresponding point detection and the like.

Thus, in the case of the projection image capturing apparatus 530 configured as described above, the present technology can be also applied similarly in the case of the projection image capturing system 300 described in the first embodiment, and the features and the advantageous effects described above can be provided.

Moreover, the present technology has been described above with reference to the projection image capturing system, but may be applied to an optional configuration including an image display function or an optional configuration for performing processing for image display, such as an image display apparatus and an image display system.

4. Other

<Application Fields of Present Technology>

As long as an image can be processed, the present technology can be applied to, for example, systems, apparatuses, processing sections used for optional fields such as traffic, healthcare, crime prevention, agriculture, farming, mining, beauty care, factories, home electronics, weather, nature monitoring, and the like.

For example, the present technology can be also applied to systems and devices provided for viewing. Moreover, the present technology can be, for example, also applied to systems and devices for traffic management. Further, the present technology can be, for example, also applied to systems and devices for security. In addition, the present technology can be, for example, also applied to systems and devices for sports. Moreover, the present technology can be, for example, also applied to systems and devices for agriculture. Further, the present technology can be, for example, also applied to systems and devices for farming. In addition, the present technology can be, for example, also applied to systems and devices for monitoring the state of nature such as volcanos, forests, and oceans. Moreover, the present technology can be, for example, also applied to a weather observation system and a weather observation apparatus configured to observe weather, an air temperature, a humidity, a wind velocity, hours of daylight, and the like. Further, the present technology can be, for example, also applied to systems, devices configured to observe the biology of wildlife such as birds, fish, reptiles, amphibia, mammals, insects, and plants, and the like.

<Software>

A series of processing described above can be executed by hardware, or can be executed by software. Alternatively, part of the processing can be executed by hardware, and other part of the processing can be executed by software. In the case of executing a series of processing described above by the software, a program, data forming the software, and the like are installed from a network or a recording medium.

For example, in the case of the control apparatus 301 of FIG. 21, this recording medium includes, in addition to an apparatus body, the removable medium 341 arranged to record the program, the data, and the like to deliver, to a user, a program, data, and the like. In this case, the removable medium 341 is, for example, attached to the drive 335 so that the program, the data stored in the removable medium 341, and the like can be read and can be installed in the storage section 333.

Moreover, in the case of, for example, the projection image capturing apparatus 302 of FIG. 26, this recording medium includes, in addition to the apparatus body, the removable medium 421 arranged to record the program, the data, and the like to deliver, to the user, a program, data, and the like. In this case, the removable medium 421 is, for example, attached to the drive 415 so that the program, the data stored in the removable medium 421, and the like can be read and can be installed in the storage section 413.

Alternatively, the program, the data, and the like can be provided through a wired or wireless transmission medium such as a local area network, the Internet, or digital satellite broadcasting. For example, in the case of the control apparatus 301 of FIG. 21, the program, the data, and the like can be received by the communication section 334, and can be installed in the storage section 333. Moreover, in the case of, for example, the projection image capturing apparatus 302 of FIG. 26, the program, the data, and the like can be received by the communication section 414, and can be installed in the storage section 413.

As another alternative, the program, the data, and the like can be installed in advance in the storage section, the ROM, or the like. For example, in the case of the control apparatus 301 of FIG. 21, the program, the data, and the like can be installed in advance in the storage section 333, the ROM 322, or the like. Moreover, in the case of, for example, the projection image capturing apparatus 302 of FIG. 26, the program, the data, and the like can be installed in advance in the ROM (not shown) build in the storage section 413 or the control section 401 and the like.

<Remarks>

The embodiments of the present technology are not limited to those described above, and various changes can be made without departing from the gist of the present technology.

For example, the present technology can be implemented as any configuration forming the apparatus or the system, for example, a processor as a system large scale integration (LSI) and the like, a module using multiple processors and the like, a unit using multiple modules and the like, a set formed by further addition of other functions to the unit, or the like (i.e., a partial configuration of the apparatus).

Note that in the present specification, the system means the group of multiple components (apparatuses, modules (parts), or the like) regardless of whether or not all components are in the same housing. Thus, any of multiple apparatuses housed in separate housings and connected through a network and a single apparatus housing multiple modules in a single housing is the system.

Moreover, as long as the processing section has the functions described above, the processing section may be implemented by any configuration. For example, the processing section may include an optional circuit, LSI, system LSI, processor, module, unit, set, device, apparatus, system, or the like. Alternatively, multiple ones of these components may be combined. For example, multiple configurations of the same type such as multiple circuits or multiple processors may be combined, or configurations of different types such as a circuit and a LSI may be combined.

Further, the configuration described as a single apparatus (or a single processing section) may be, for example, divided into multiple apparatuses (or multiple processing sections). Conversely, the configurations described above as multiple apparatuses (or multiple processing sections) may be collectively configured as a single apparatus (or a single processing section). In addition, other configurations than those described above may be added to the configuration of each apparatus (or each processing section). Moreover, as long as the substantially same configuration or operation of the entirety of the system is provided, part of a configuration of a certain apparatus (or a certain processing section) may be included in other apparatuses (or other processing sections).

Further, the present technology may have, for example, a cloud computing configuration for processing a single function by multiple apparatuses through a network in cooperation.

In addition, for example, the above-described program can be executed in an optional apparatus. In this case, such an apparatus is only required to have a necessary function (a functional block and the like) to obtain necessary information.

Moreover, for example, each step described in the above-described flowcharts can be executed by a single apparatus, and can be also executed by multiple apparatuses in cooperation. Further, in a case where a single step includes multiple types of processing, these multiple types of processing included in the single step can be executed by a single apparatus, and can be also executed by multiple apparatuses in cooperation. In other words, multiple types of processing included in a single step can be executed as multiple types of step processing. Conversely, the processing described as multiple steps can be collectively executed as a single step.

A program executed by a computer may be executed such that the processing of steps describing the program is executed in chronological order in the order described in the present specification, or may be separately executed in parallel or at necessary timing such as invocation timing. That is, as long as there are no inconsistencies, the processing of each step may be executed in an order different from that described above. Further, the processing of the steps describing the program may be executed in parallel with other types of program processing, or may be executed in combination with other types of program processing.

The multiple present technologies described in the present specification can be independently implemented alone as long as there are no inconsistencies. Needless to say, optional ones of the multiple present technologies can implemented in combination. For example, part or the entirety of the present technology described in any of the embodiments can be implemented in combination with part or the entirety of the present technology described in other embodiments. Alternatively, some or all of optional ones of the present technologies described above can be implemented in combination with other technologies not described above.

Note that the present technology can have the following configurations.

(1) An image processing apparatus including
an adjustment section configured to adjust, according to a luminance of a contents image, a luminance difference between two pattern images projected in a superimposed state on the contents image, having an identical shape, and having patterns in opposite luminance change directions.

(2) The image processing apparatus according to (1), in which
the adjustment section decreases the luminance difference as the luminance of the contents image increases.

(3) The image processing apparatus according to (2), in which
the adjustment section decreases the luminance difference in a case where the luminance of the contents image is higher than a predetermined threshold.

(4) The image processing apparatus according to any one of (1) to (3), in which
the adjustment section increases the luminance difference as the luminance of the contents image decreases.

(5) The image processing apparatus according to (4), in which
the adjustment section increases the luminance difference in a case where the luminance of the contents image is lower than a predetermined threshold.

(6) The image processing apparatus according to any one of (1) to (5), in which
the adjustment section adjusts the luminance difference such that a luminance of a projection image does not exceed an upper limit.

(7) The image processing apparatus according to any one of (1) to (6), in which
the adjustment section adjusts the luminance difference such that a luminance of a projection image does not fall below a lower limit.

(8) The image processing apparatus according to any one of (1) to (7), in which
in a case where a luminance of a projection image of the contents image is closer to an upper limit of the luminance of the projection image than to a lower limit, the adjustment section adjusts the luminance difference such that the luminance of the projection image does not exceed the upper limit, and
in a case where the luminance of the projection image of the contents image is closer to the lower limit of the luminance of the projection image than to the upper limit, the adjustment section adjusts the luminance difference such that the luminance of the projection image does not fall below the lower limit.

(9) The image processing apparatus according to any one of (1) to (8), in which
the adjustment section adjusts the luminance difference for every pixel.

(10) The image processing apparatus according to (9), in which
the adjustment section adjusts the luminance difference for a processing target pixel according to a luminance of the processing target pixel of the contents image.

(11) The image processing apparatus according to any one of (1) to (10), further including
a projection section configured to project the contents image on which the pattern image is superimposed.

(12) An image processing method including
adjusting, according to the luminance of a contents image, a luminance difference between two pattern images projected in a superimposed state on the contents image, having an identical shape, and having patterns in opposite luminance change directions.

(13) An image processing apparatus including
a corresponding point detection section configured to capture a projection image of a pattern image, detect a pattern of the pattern image from an obtained captured image, and repeat capturing of the projection image and detection of the pattern from the captured image until the reliability of all patterns included in detection results reaches high when a corresponding point is detected from the detected pattern.

(14) The image processing apparatus according to (13), in which
the corresponding point detection section removes a low-reliability pattern included in the detection result in each detection of the pattern, and integrates each detection result to detect the corresponding point.

(15) The image processing apparatus according to (13) or (14), in which
the corresponding point detection section calculates correction information for correcting the projection image on the basis of the detected corresponding point.

(16) The image processing apparatus according to (15), in which
the corresponding point detection section removes, in each detection of the pattern, a low-reliability pattern included in the detection result to calculate the correction information, and integrates the correction information.

(17) The image processing apparatus according to (16), in which
the corresponding point detection section calculates an average of the correction information.

(18) The image processing apparatus according to (16), in which
the corresponding point detection section weights the correction information of each detection according to the reliability, and integrates the correction information.

(19) The image processing apparatus according to any one of (13) to (18), further including
an image capturing section configured to capture the projection image.

(20) An image processing method including
capturing a projection image of a pattern image, detecting a pattern of the pattern image from an obtained captured image, and repeating capturing of the projection image and detection of the pattern from the captured image until a reliability of all patterns included in detection results reaches high when a corresponding point is detected from the detected pattern.

REFERENCE SIGNS LIST

100 Pattern image
101 Pattern
300 Projection image capturing system
301 Control apparatus
302 Projection image capturing apparatus
311 Projection section
312 Image capturing section
351 Pattern image projection processing section
352 Corresponding point detection processing section
361 Contents image acquisition section
362 Pattern image acquisition section
363 Pattern image adjustment section
364 Synthesis section
365 Projection control section
371 Pixel selection section
372 Amplitude adjustment section
373 Luminance clipping section
374 High-luminance amplitude adjustment section
375 Low-luminance amplitude adjustment section
376 Luminance value upper limit processing section
377 Luminance value lower limit processing section
378 Luminance value upper/lower limit processing section
381 Image capturing control section
382 Noise reduction section
383 Pattern difference image generation section
384 Reliability determination section
385 Low-reliability region removal section
386 Corresponding point detection section
387 Correction information calculation section
388 Corresponding point detection control section
389 Correction integration section
401 Control section
500 Projection image capturing system
501 Network
510 Projection image capturing system
511 Projection apparatus
512 Image capturing apparatus
520 Projection image capturing system
521 Projection image capturing apparatus
523 Control section
530 Projection image capturing apparatus

The invention claimed is:
1. An image processing apparatus, comprising:
circuitry configured to:
determine a luminance difference between a first pattern image and a second pattern image, wherein
the first pattern image is projected in a superimposed state on a first frame of a contents image,
the second pattern image is projected in a superimposed state on a second frame of the contents image,
the first pattern image has a shape identical to a shape of the second pattern image, and
the first pattern image has a pattern in a luminance change direction opposite to that of a pattern of the second pattern image; and
adjust the luminance difference between the first pattern image and the second pattern image based on a luminance of the contents image.

2. The image processing apparatus according to claim 1, wherein the circuitry is further configured to decrease the luminance difference based on increase of the luminance of the contents image.

3. The image processing apparatus according to claim 2, wherein the luminance of the contents image is higher than a threshold value.

4. The image processing apparatus according to claim 1, wherein the circuitry is further configured to increase the luminance difference based on decrease of the luminance of the contents image.

5. The image processing apparatus according to claim 4, wherein the luminance of the contents image is lower than a threshold value.

6. The image processing apparatus according to claim 1, wherein the circuitry is further configured to adjust the luminance difference such that a luminance of a projection image is lower than an upper limit.

7. The image processing apparatus according to claim 1, wherein the circuitry is further configured to adjust the luminance difference such that a luminance of a projection image is greater than a lower limit.

8. The image processing apparatus according to claim 1, wherein
in a case where a luminance of a projection image of the contents image is closer to an upper limit of the luminance of the projection image than to a lower limit of the luminance of the projection image, the circuitry is further configured to adjust the luminance difference such that the luminance of the projection image is lower than the upper limit, and
in a case where the luminance of the projection image of the contents image is closer to the lower limit of the luminance of the projection image than to the upper limit, the circuitry is further configured to adjust the luminance difference such that the luminance of the projection image is greater than the lower limit.

9. The image processing apparatus according to claim 1, wherein the circuitry is further configured to adjust the luminance difference for each pixel of a plurality of pixels of the first pattern image.

10. The image processing apparatus according to claim 9, wherein the circuitry is further configured to adjust the luminance difference for a processing target pixel based on a luminance of the processing target pixel of the contents image.

11. The image processing apparatus according to claim 1, further comprising a projection section configured to project:
   the first frame of the contents image on which the first pattern image is superimposed, and
   the second frame of the contents image on which the second pattern image is superimposed.

12. An image processing method, comprising:
   determining a luminance difference between a first pattern image and a second pattern image, wherein
      the first pattern image is projected in a superimposed state on a first frame of a contents image,
      the second pattern image is projected in a superimposed state on a second frame of the contents image,
      the first pattern image has a shape identical to a shape of the second pattern image, and
      the first pattern image has a pattern in a luminance change direction opposite to that of a pattern of the second pattern image; and
   adjusting the luminance difference between the first pattern image and the second pattern image based on a luminance of the contents image.

* * * * *